(12) United States Patent
Deak, Sr.

(10) Patent No.: US 11,855,505 B2
(45) Date of Patent: Dec. 26, 2023

(54) INLINE ACTUATED HORIZONTAL PENDULUM ENERGY HARVESTING GENERATOR AND BATTERY-FREE WIRELESS REMOTE SWITCHING SYSTEM

(71) Applicant: David Deak, Sr., Suffern, NY (US)

(72) Inventor: David Deak, Sr., Suffern, NY (US)

( * ) Notice: Subject to any disclaimer, the term of this patent is extended or adjusted under 35 U.S.C. 154(b) by 271 days.

(21) Appl. No.: 17/461,951

(22) Filed: Aug. 30, 2021

(65) Prior Publication Data

US 2022/0069690 A1    Mar. 3, 2022

Related U.S. Application Data

(60) Provisional application No. 63/072,136, filed on Aug. 29, 2020.

(51) Int. Cl.
*H02K 35/02* (2006.01)
*H02K 3/04* (2006.01)

(52) U.S. Cl.
CPC .............. *H02K 35/02* (2013.01); *H02K 3/04* (2013.01)

(58) Field of Classification Search
CPC ........ H02K 35/02; H02K 3/04; H02K 7/1869; H02K 7/1876; H02K 7/1892
USPC ........................................ 310/37, 15–25, 36
See application file for complete search history.

(56) References Cited

U.S. PATENT DOCUMENTS

| | | | | |
|---|---|---|---|---|
| 473,960 | A * | 5/1892 | Reckenzaun | H02K 7/065 310/37 |
| 753,757 | A * | 3/1904 | Talcott et al. | G04C 3/027 368/134 |
| 3,652,955 | A * | 3/1972 | Cruger | H03B 5/30 318/116 |
| 5,679,988 | A * | 10/1997 | Ito | H02K 33/16 73/36 |
| 8,299,659 | B1 * | 10/2012 | Bartol, Jr. | H02K 35/02 310/152 |
| 8,492,936 | B1 * | 7/2013 | Waters | H02K 35/02 310/20 |
| 8,816,541 | B1 * | 8/2014 | Bristow | H02K 35/02 310/36 |
| 9,570,969 | B1 * | 2/2017 | Bristow, Jr. | H02K 21/00 |
| 2009/0015103 | A1 * | 1/2009 | Rastegar | H02N 2/18 60/504 |
| 2010/0127500 | A1 * | 5/2010 | Yang | F03G 7/08 290/53 |

(Continued)

*Primary Examiner* — Maged M Almawri

(57) ABSTRACT

The present disclosure is of energy harvesting generators producing power to electrical loads by a novel method of the inline triggering of a horizontal pendulum that vertically oscillates for an established time duration. The horizontal pendulum component has disposed and fixed, a magnet whose travel is under the direct influence of the motion of the pendulum component. This oscillation of the pendulum and its disposed magnet is situated proximal to an electrical coil that has disposed a magnet enclosure with a disposed magnet that is in the center of the coil arrangement. The instant triggering is accomplished by a novel trigger whose end has a first trigger tooth that upon an external applied force comes in contact with a second trigger tooth that forces the pendulum downward beyond it release position to allow the pendulum and magnet to freely oscillate. Converse action occurs when the triggering force is instantly removed.

24 Claims, 23 Drawing Sheets

(56) References Cited

U.S. PATENT DOCUMENTS

| | | | | |
|---|---|---|---|---|
| 2011/0278847 A1* | 11/2011 | Hench | ............... | H02K 3/47 |
| | | | | 310/68 D |
| 2012/0139262 A1* | 6/2012 | Begley | ............... | F03G 7/08 |
| | | | | 290/1 R |
| 2012/0169148 A1* | 7/2012 | Kim | ............... | H02K 33/16 |
| | | | | 310/25 |
| 2013/0015667 A1* | 1/2013 | Fullerton | ............... | H02K 21/24 |
| | | | | 290/1 A |
| 2013/0221680 A1* | 8/2013 | Mian | ............... | H02K 35/04 |
| | | | | 310/154.02 |
| 2015/0054285 A1* | 2/2015 | Hobdy | ............... | F03B 15/00 |
| | | | | 290/53 |
| 2015/0135869 A1* | 5/2015 | Jia | ............... | F03G 7/08 |
| | | | | 74/96 |
| 2015/0372564 A1* | 12/2015 | Nagaya | ............... | H02K 35/02 |
| | | | | 290/1 R |
| 2016/0170377 A1* | 6/2016 | Hamatani | ............... | F03G 1/10 |
| | | | | 368/204 |
| 2017/0069823 A1* | 3/2017 | Karpelson | ............... | H02K 1/2798 |
| 2019/0131098 A1* | 5/2019 | Deak, Sr. | ............... | H02K 99/10 |
| 2020/0076288 A1* | 3/2020 | Nerubenko | ............... | F16F 7/1005 |
| 2020/0195117 A1* | 6/2020 | Ohishi | ............... | H02K 35/02 |
| 2020/0208616 A1* | 7/2020 | Lee | ............... | H10N 30/30 |
| 2021/0211032 A1* | 7/2021 | Haronian | ............... | H02K 35/02 |
| 2021/0313861 A1* | 10/2021 | Taylor | ............... | H02K 35/04 |
| 2021/0347215 A1* | 11/2021 | Haronian | ............... | B60C 23/0474 |
| 2022/0294325 A1* | 9/2022 | Deak, Sr. | ............... | H02K 7/1853 |
| 2022/0337144 A1* | 10/2022 | Boisseau | ............... | H02K 35/04 |

* cited by examiner

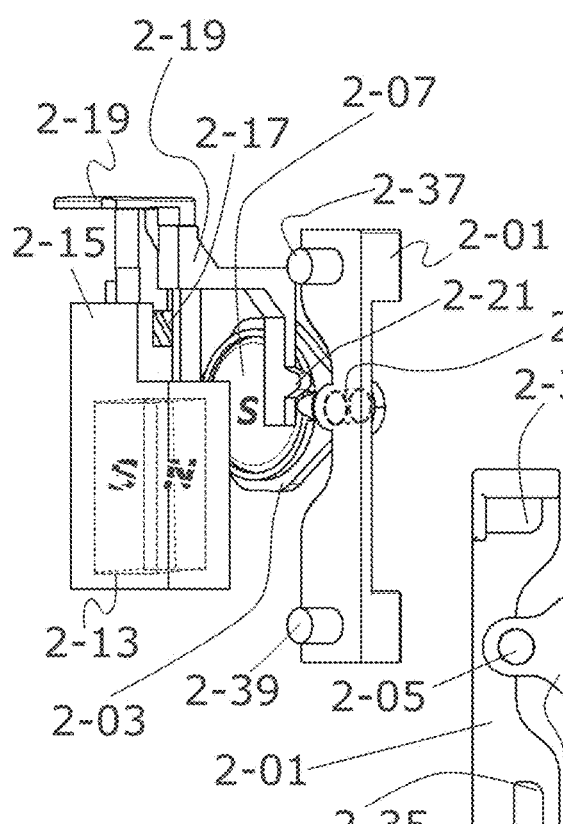
FIG. 6a
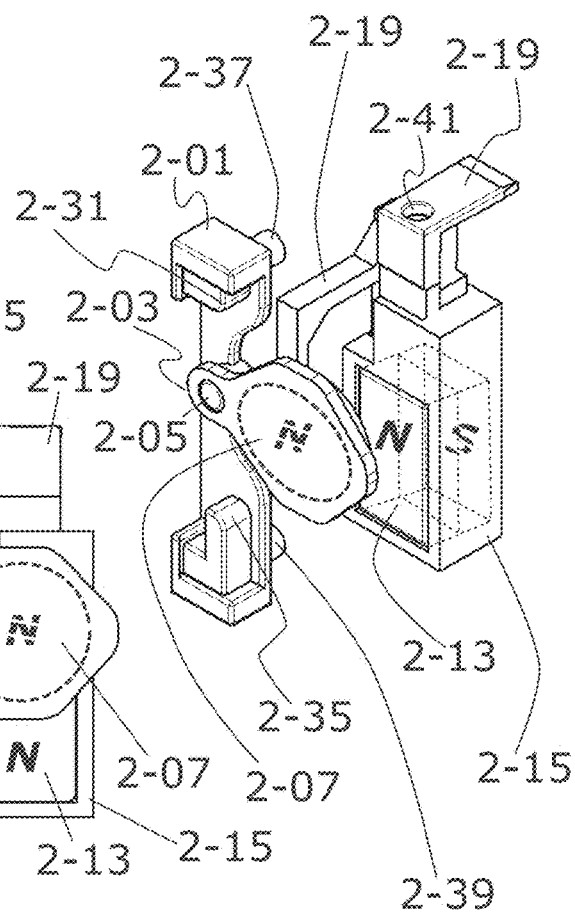
FIG. 6c
FIG. 6b
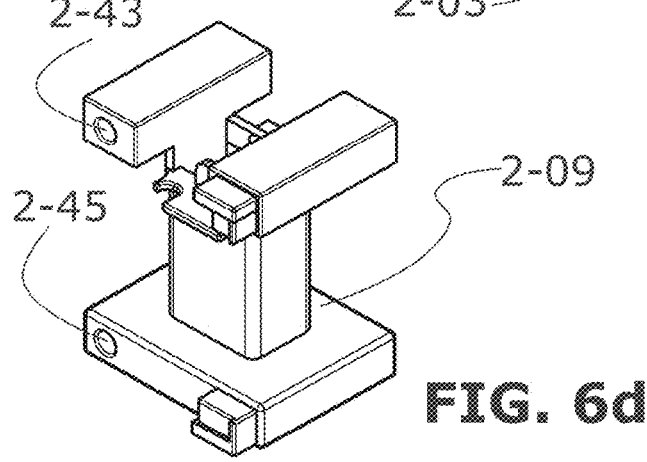
FIG. 6d

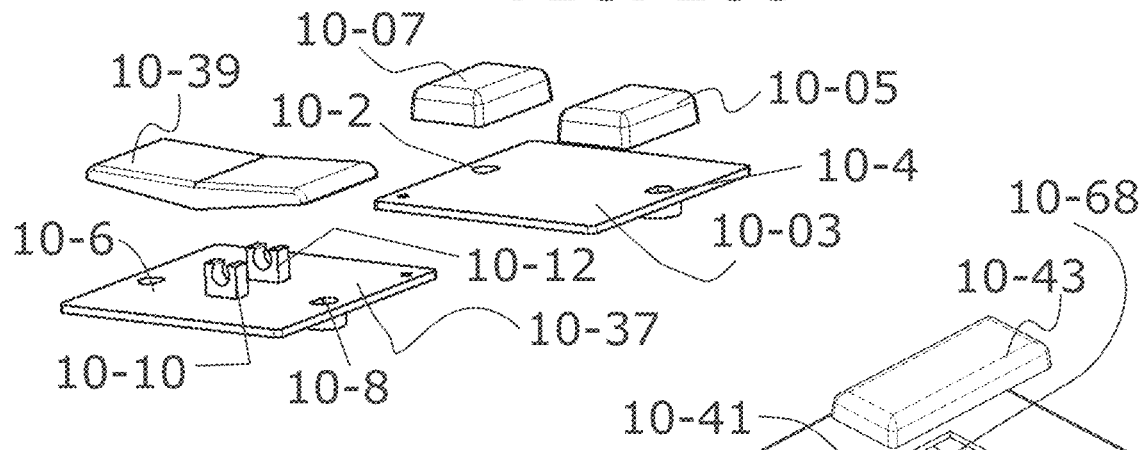
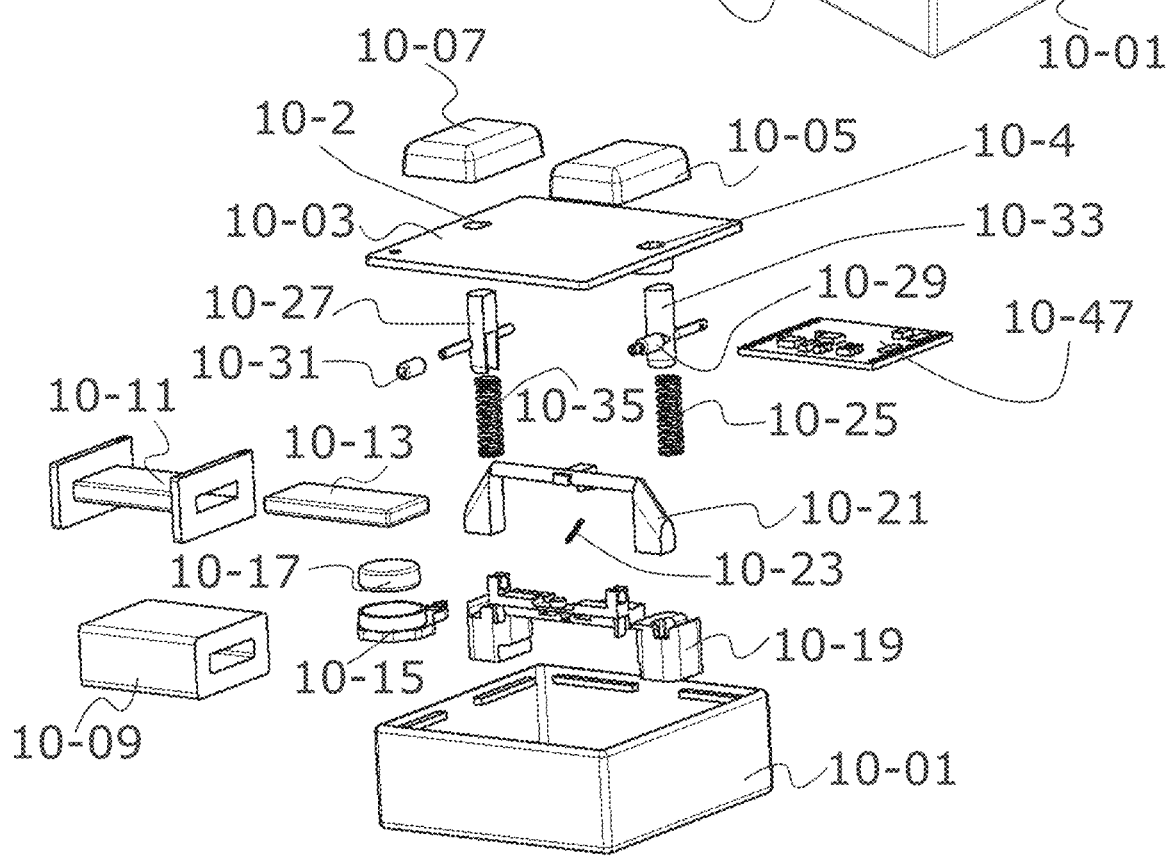

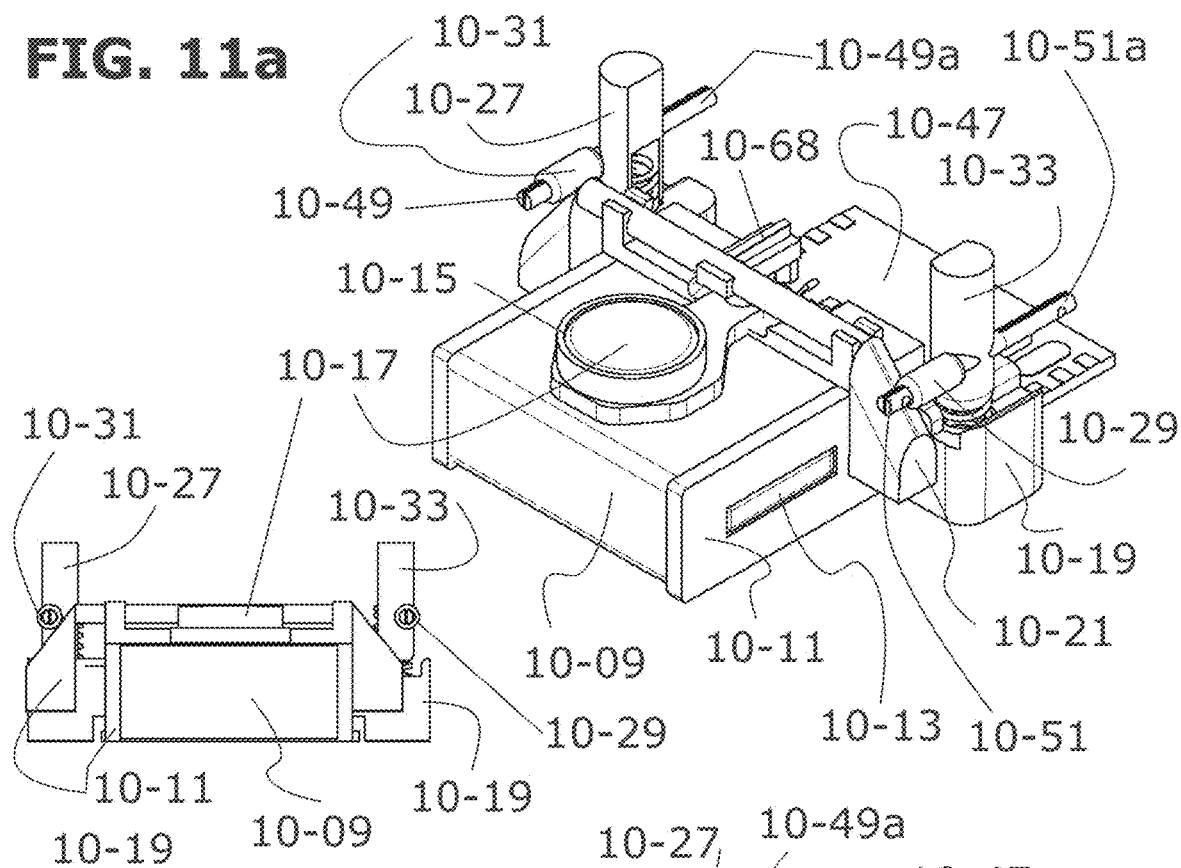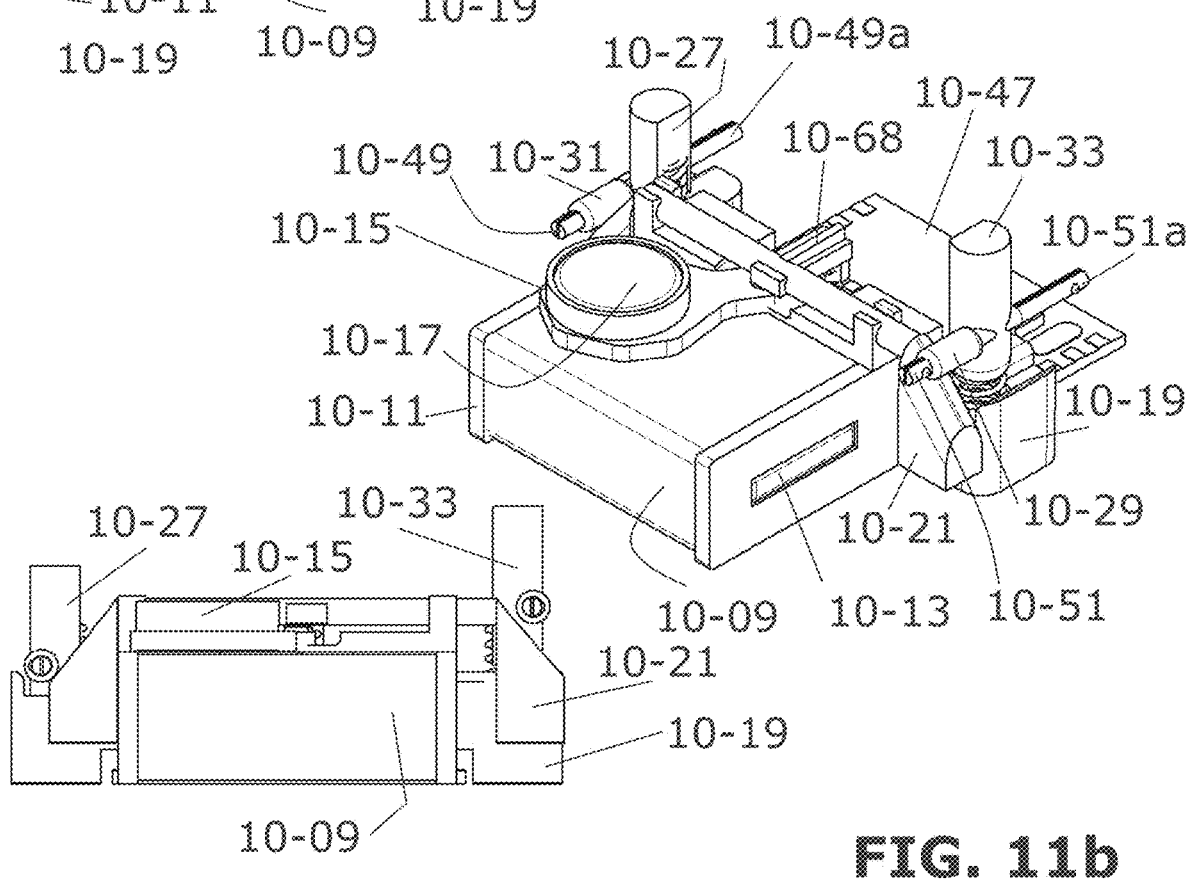

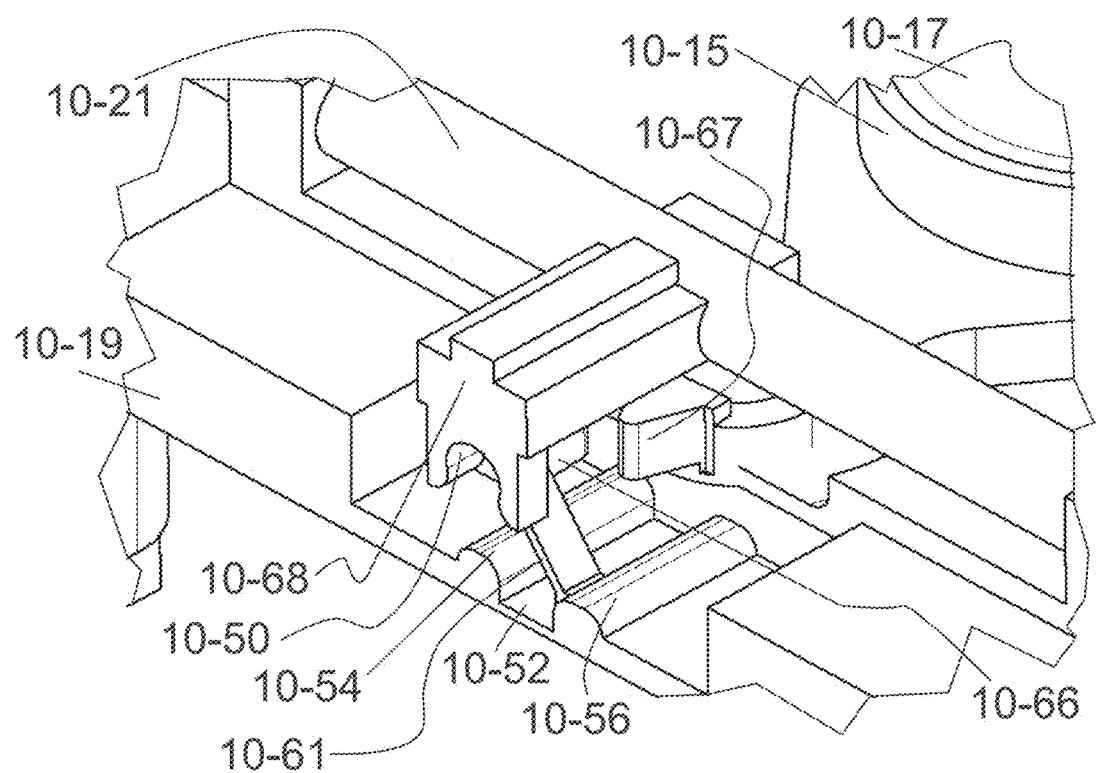
FIG. 13-1-A
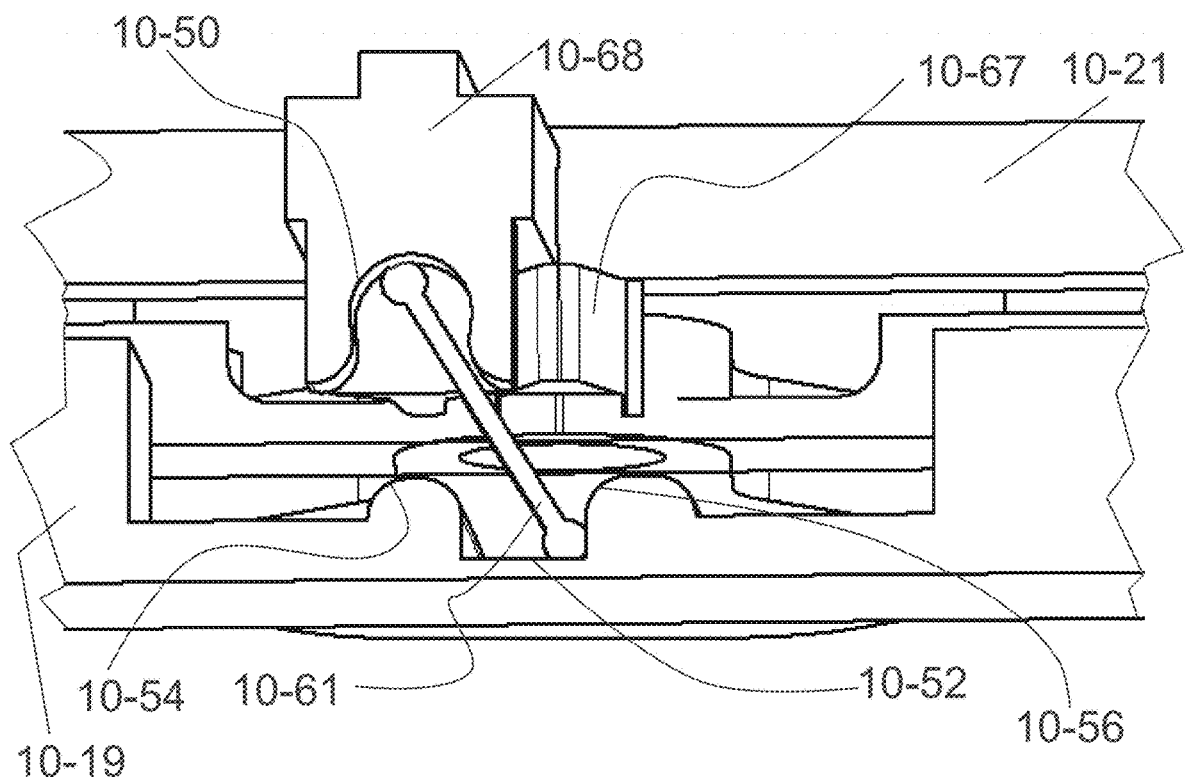
FIG. 13-1-B

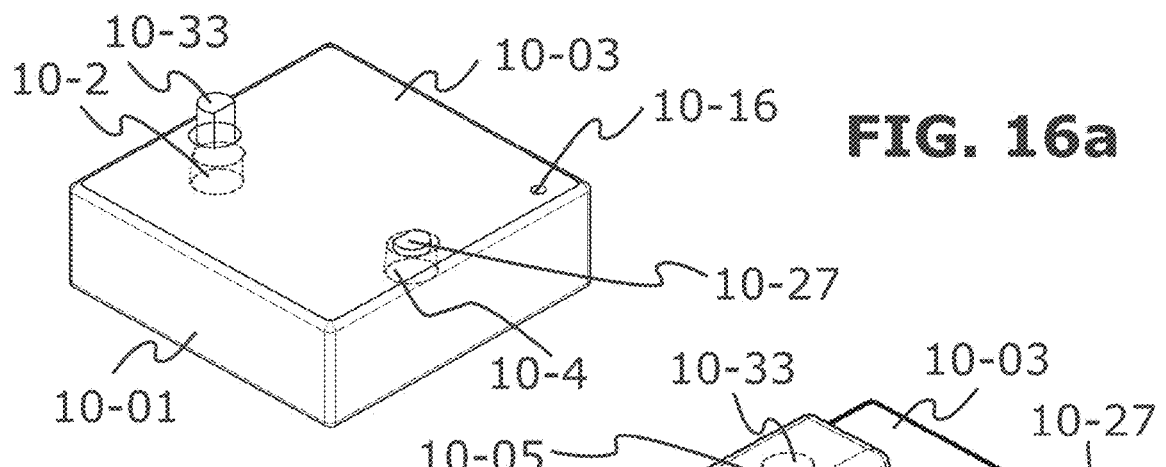
FIG. 16a
FIG. 16b
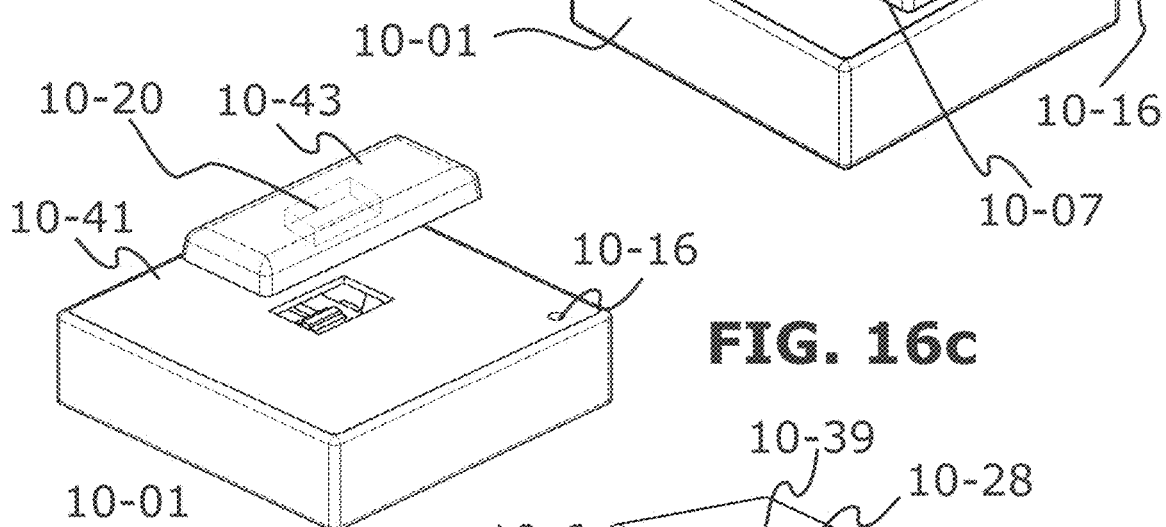
FIG. 16c
FIG. 16d
FIG. 16e

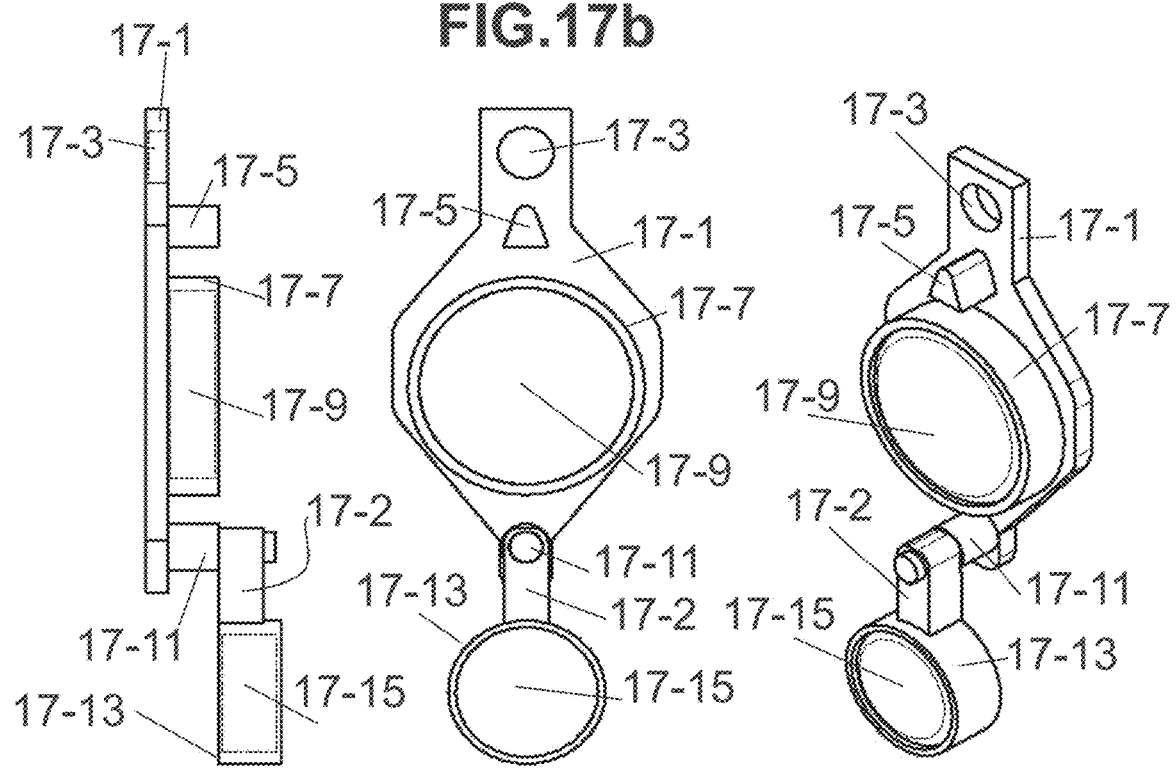
FIG.17b
FIG.17a
FIG.17c
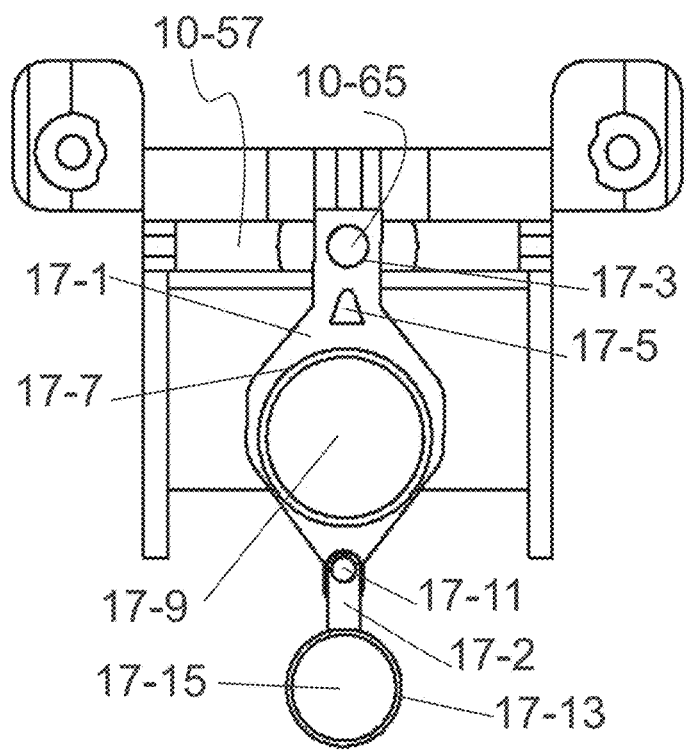
FIG.17d

FIG. 19

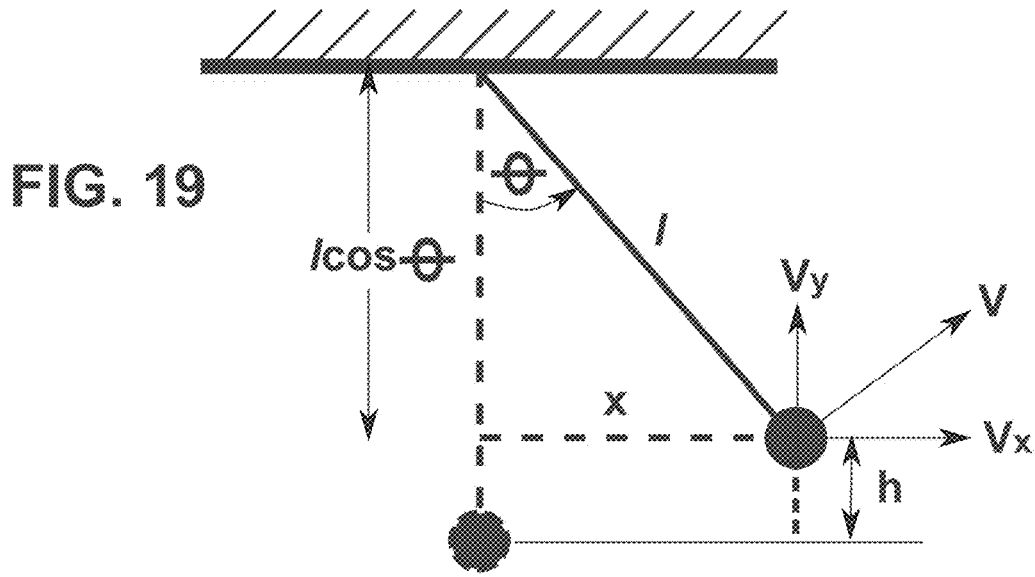

$x = l\sin\theta \quad y = l - l\cos\theta$ $l$ = length
$h = l - l\cos\theta$ $V_x = dx/dt = \dot{x} = l\cos\theta \cdot \dot{\theta}$ $KE = 1/2\, mv^2$ $PE = mgh$ $V_y = dx/dt = \dot{y} = l\sin\theta \cdot \dot{\theta}$ $KE = 1/2\, mv^2 = 1/2\, m(V_x^2 - V_y^2) \qquad T = 2\pi \left( \dfrac{l}{(g - F_m)} \right)^{1/2}$ $KE = 1/2\, m l^2 \dot{\theta}^2$ $L = KE - PE \quad \text{(The Lagrangian)}$ $F_m = \left( \dfrac{F_p \times F_s}{d^3} \right)$ The frequency of oscillations f, is the reciprocal of T, Time $f = 1/T$ Fp = Magnetic force of the pendulum magnet.

Fs = Magnetic force of the stationary coil magnet.

d = distance between magnets $T = 2\pi \left\{ \dfrac{l}{g - \left( \dfrac{F_p \times F_s}{d^3} \right)} \right\}^{1/2}$

INLINE ACTUATED HORIZONTAL PENDULUM ENERGY HARVESTING GENERATOR AND BATTERY-FREE WIRELESS REMOTE SWITCHING SYSTEM

FIELD OF DISCLOSURE

The field of disclosure relates to electromagnetic energy harvesting generators. More specifically, it relates to such a generator that utilizes the inline activation of a freely oscillating pendulum.

BACKGROUND OF THE INVENTION

Current classifications of low power (<10 watts) output energy harvesting generators are of the electromagnetic type, solar type, piezoelectric type, and Coulomb Transition Force types. Of these, the focus of this invention is on the electromagnetic type and a novel methodology of utilizing the laws of Faraday, Lenz, Maxwell, and Einstein's Special Theory of Relativity relating to electrodynamic systems.

Throughout the history of electromagnetic induction, first discovered and initialed experimentally by Michael Faraday in 1831, then mathematically refined by James Clerk Maxwell around 1861, and further refined and concluded by Lorentz and then Einstein that magnetism and gravity are fictitious forces A fictitious force (also called a pseudo force, d'Alembert force, or inertial force) is an apparent force that acts on all masses whose motion is described using a non-inertial frame of reference, such as a rotating reference frame.

SUMMARY OF THE DISCLOSURE OF THE INVENTION

What is among those things that are novel, as disclosed herein, is generating electrical energy from a first embodiment of a simple pendulum with disposed magnet, and a second embodiment of a double pendulum with disposed magnets at each pendulum base.

The generator can utilize the inline activation of a freely oscillating pendulum. The generator can contain a first magnet that is disposed and fixed within the pendulum, which when activated produces instant electrical energy by having the magnetic field of the moving pendulum magnet interact with a second stationary magnet centered within a coil of wire wound in a manner that that the coil wire remains perpendicular to the motion of the moving magnetic field lines of flux. The action of the moving pendulum causes the pendulum magnet's lines of flux to cut through the coil wire and produces, by Faraday's and Lenz's Law, an electrical potential between the terminal wires of the coil.

The generator can contain a first magnet that is disposed and fixed within the pendulum, which when activated produces instant electrical energy by having the magnetic field of the moving pendulum magnet interact with a second stationary magnet centered within a coil of wire wound in a manner that that the coil wire remains perpendicular to the motion of the moving magnetic field lines of flux. The action of the moving pendulum causes the pendulum magnet's lines of flux to cut through the coil wire and produces, by Faraday's and Lenz's Law, an electrical potential between the terminal wires of the coil.

The disclosure further includes a first embodiment of a simple pendulum that has a magnet and when actuated in a simple harmonic oscillating motion swings past a coil that has an inner stationary magnet. This simple harmonic motion will induce a sinusoidal voltage at the terminals of the coil. Further the present disclosure includes a second embodiment of the invention with a complex Lagrangian dual pendulum with dual magnets disposed on each pendulum that will produce a complex voltage waveform at the terminals of the coil that can be described as a complex waveform by Fourier analysis leading to an infinite number of possible combinations of dual independent oscillations primarily governed in the end as the oscillations are influenced by the two magnets on each pendulum passing within magnetic influence of each other, periodically.

A novel feature disclosed is generating electrical energy from a first embodiment of a simple pendulum with disposed magnet, and a second embodiment of a double pendulum with magnets disposed at each pendulum base. Further, the first embodiment of the single pendulum is mathematically defined by Lagrangian Mechanics and the second embodiment of a double pendulum is defined initially by Lagrangian Mechanics and influenced by mathematical Chaos Theory. In all of the embodiments the electrical so power generated is scalable in physical size and consequently electrical power output.

BRIEF DESCRIPTION OF THE DRAWINGS

FIG. 6a is a first angular turned position view of the fundamental triggering sub-system.

FIG. 6b is a front view of the fundamental triggering sub-system.

FIG. 6c is second angular turned view of the fundamental triggering sub-system.

FIG. 6d is a perspective view of the system coil bobbin on to which items in FIGS. 6a, 6b, and 6c are disposed.

FIG. 10a is an exploded view of a second generator embodiment as a complete generator with all components including a transmitter module that serves as a radio transmitter system FIG. 10b is a perspective view of a second generator embodiment system enclosed in a box container with a top cover and slide knob button utilized to control a forward and reverse action sliding triggering to generate power to operate a transmitter module.

FIG. 10c shows the second embodiment with two additional different top covers for operating the generator as a dual pushbutton triggered system and a dual rocking (see-saw) action triggered system.

FIG. 11a includes back and top perspective views of the second embodiment complete generator pendulum triggering system in its resting or non-triggered mode.

FIG. 11b includes back and top perspective views of the second embodiment complete generator pendulum triggering system in an initial state action causing a first initial left directional maximum swing of the oscillating pendulum with its disposed magnet.

FIG. 13-1-A is an expanded top perspective view of a plurality of the triggering system components.

FIG. 13-1-B is an expanded frontal view of a plurality of the triggering system components.

FIG. 16a is a top perspective view of the enclosure box and dual push button top cover.

FIG. 16b is the top perspective view of the enclosure box and dual push button top cover with the dual push buttons disposed for dual push button operation.

FIG. 16c is a top perspective view of the box enclosure with the slide type top cover and with the slide button.

FIG. 16d is top perspective view of the box enclosure and the rocker action top cover disposed with its rocker snap action ports and the rocker (see-saw) attachment option.

FIG. 16e is a top perspective view of the slide bar component that is utilized in all three of the options for various triggering schemes that include dual push button, slide action, and rocker action.

FIG. 17a is a left side view of the dual pendulum with its two magnets.

FIG. 17b is a front view of the dual pendulum with its two magnets.

FIG. 17c is a top frontal view of the dual pendulum with its two magnets.

FIG. 17d is a front view of the dual pendulum disposed for free rotation about their respective axis and where the pendulums are at rest in an equilibrium state, prior to triggering into motion.

FIG. 19 is a vector graphic with Lagrangian equations describing mathematically, the action of the simple one pendulum system of the first embodiment of the invention.

DETAILED DESCRIPTION OF THE INVENTION

Figure 1A:
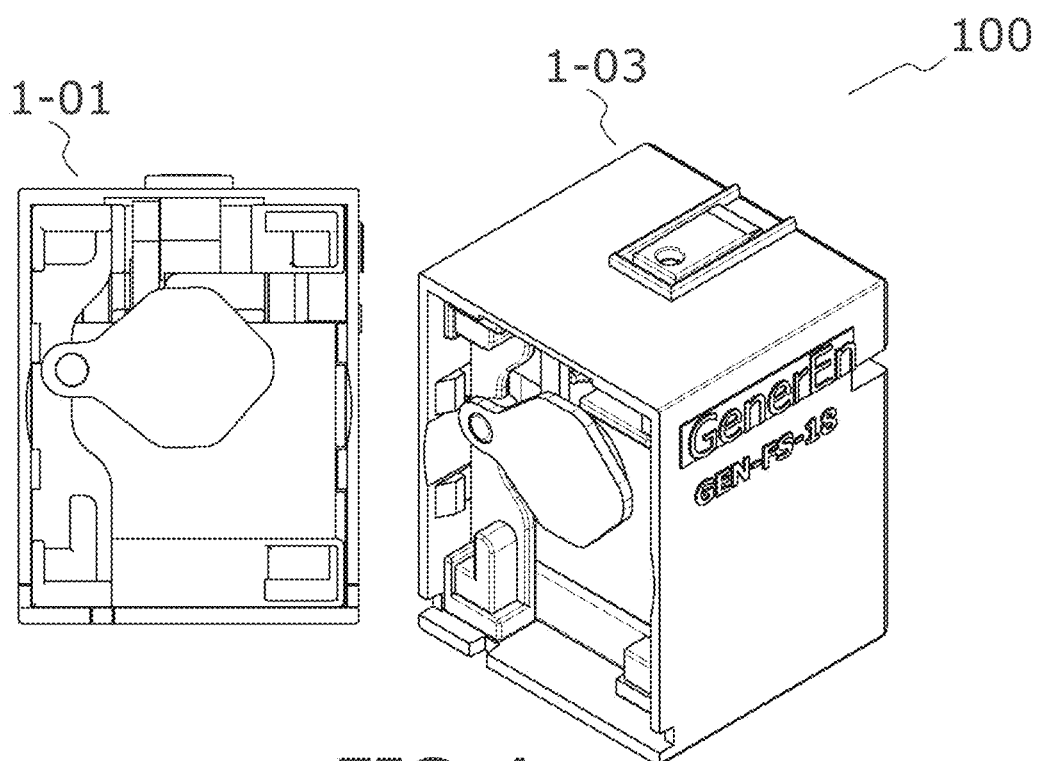
FIG. 1a are front and perspective views of an embodiment, which is the standalone energy harvesting generator housed in an enclosure that can be utilized for an industrial remote-control battery-less wireless switch system.

In FIG. 1a, there is a front view and a top frontal view 100 of the invention showing the front view of the energy harvesting generator disposed in its enclosure 1-01 and showing the top frontal view of the energy harvesting generator in its enclosure 1-03 and it is described as a standalone generator for any useful purpose in accordance to its electrical nature.

Figure 1B:
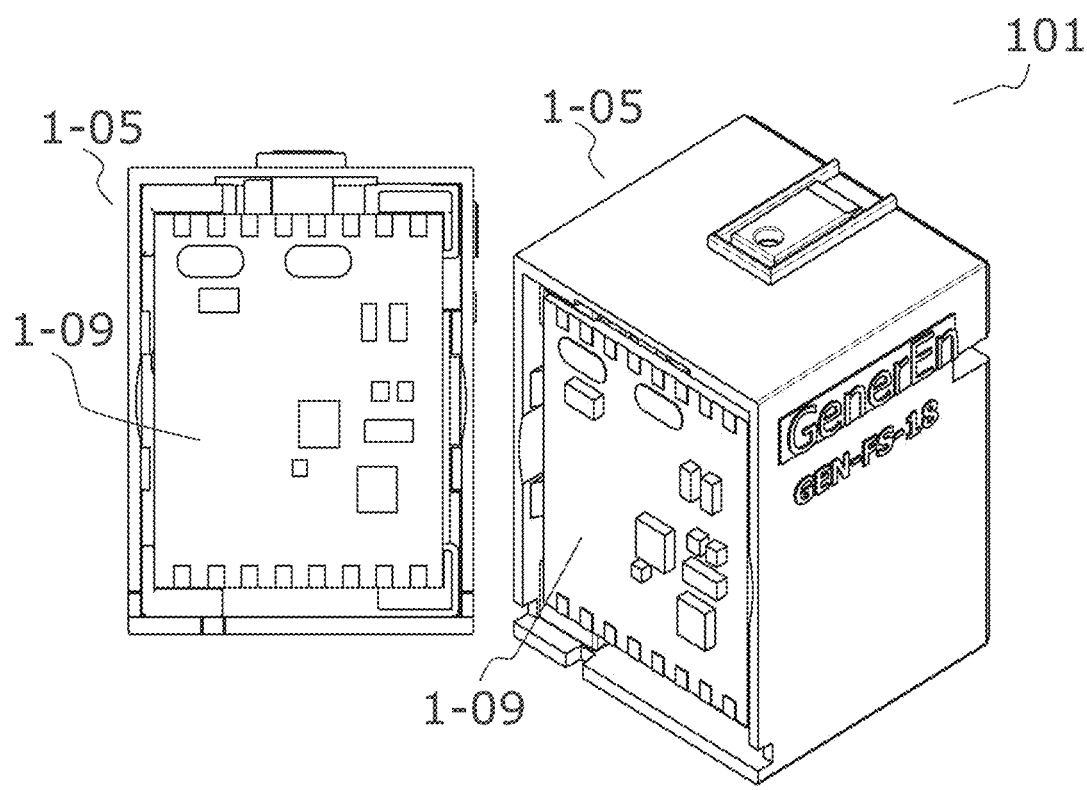
FIG. 1b are front and perspective views of an embodiment, which is the energy harvesting generator housed in an enclosure that is utilized for an industrial remote-control battery-less wireless transceiver switch system and contains a typical FCC certified ISM Band radio transmitter (ag. Enocean model PTM-535 ISM Band Radio transmitter module.)

In FIG. 1b, there is a front view and a top frontal view 101 of the invention showing the front view of the energy harvesting generator disposed in its enclosure 1-05 and showing the top frontal view of the energy harvesting generator in its enclosure 1-07 and it is described as a novel battery-less generator that is now electrically connected to a typical disposed within the enclosure 1-05 ISM Band transceiver circuit module 1-09 and is utilized to power the ISM Band transceiver circuit module to make the transceiver capable of sending radio telegrams to some remote receiver or transceiver system for any useful remote control switching purpose but not limited to switching purposes.

Figure 2A:
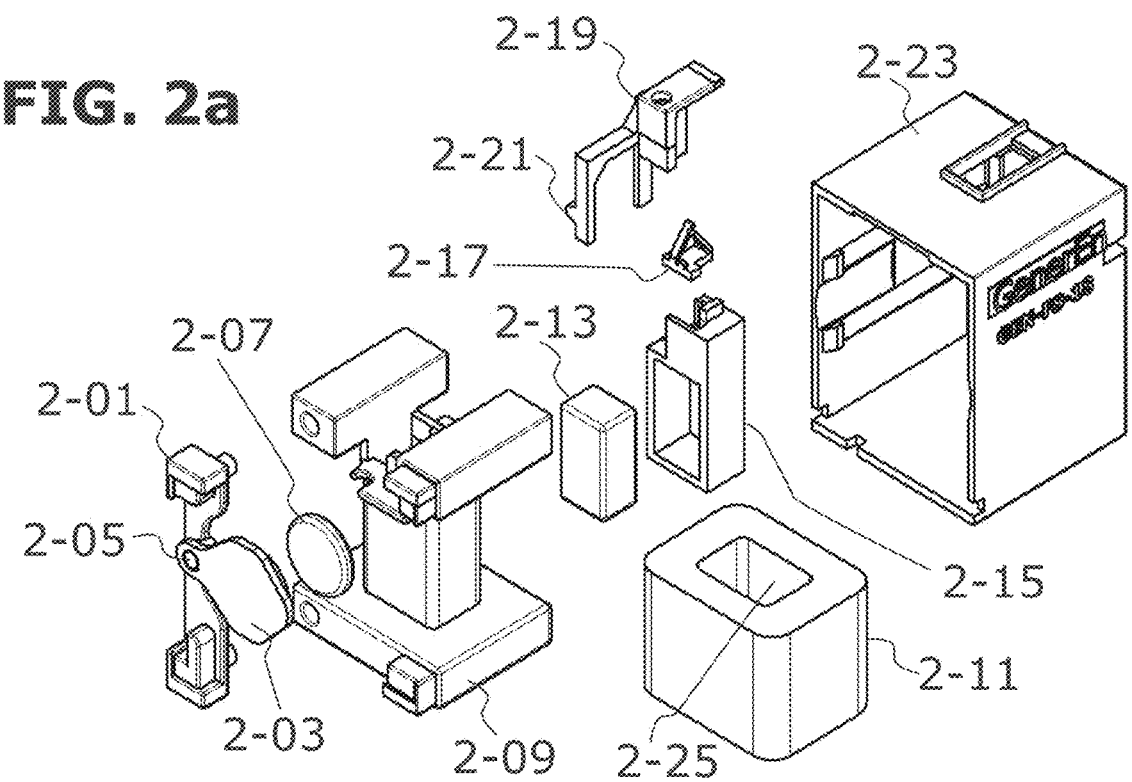
FIG. 2a is an exploded view of the standalone enclosed energy harvesting generator of FIG. 1a and FIG. 1b, showing all internal components.

FIG. 2a is an exploded view of all the components that comprise the energy harvesting generator invention that is systematically disposed within the enclosure 2-23.

Firstly, there is the coil bobbin 2-09 that has wound around its center a coil of copper wire 2-25 and there is inserted and fixed within the center of the coil bobbin 2-09 a first magnet 2-13 that is stationary that is disposed within its enclosure 2-15 and the first magnet enclosure 2-15 is disposed within the center of the coil bobbin 2-09 that has a wound coil of wire 2-11 with the wound coil wire hollow center 2-25 fitted around the coil bobbin 2-09. Fitted and attached by pendulum support's 2-01 top 2-2T and bottom 2-2B plugs, which are inserted and fixed within the coil bobbin's 2-09 top 2-4T and bottom 2-4B plug wells disposed on the left front side of the coil bobbin 2-09 is a pendulum support 2-01. Inserted and fixed with the center of the coil bobbin 2-09 atop the first magnet (bar type) enclosure 2-15 is a non-magnetic metallic dual leaf spring 2-17 that acts as a counter force device to offset the downward force of the triggering action of the control plunger sub-system 2-19 & 2-21 and force the control plunger sub-system 2-19 & 2-21 in the opposite direction of the downward applied operational triggering force. Disposed onto and secured in a free rotational manner on the pendulum support axle 2-05 is the pendulum 2-03 that has disposed on it a second magnet (disk type) 2-07 that is in unison with the pendulum 2-03 and free to rotate whilst the pendulum 2-03 is triggered into rotation about the axle 2-05.

Figure 3A:
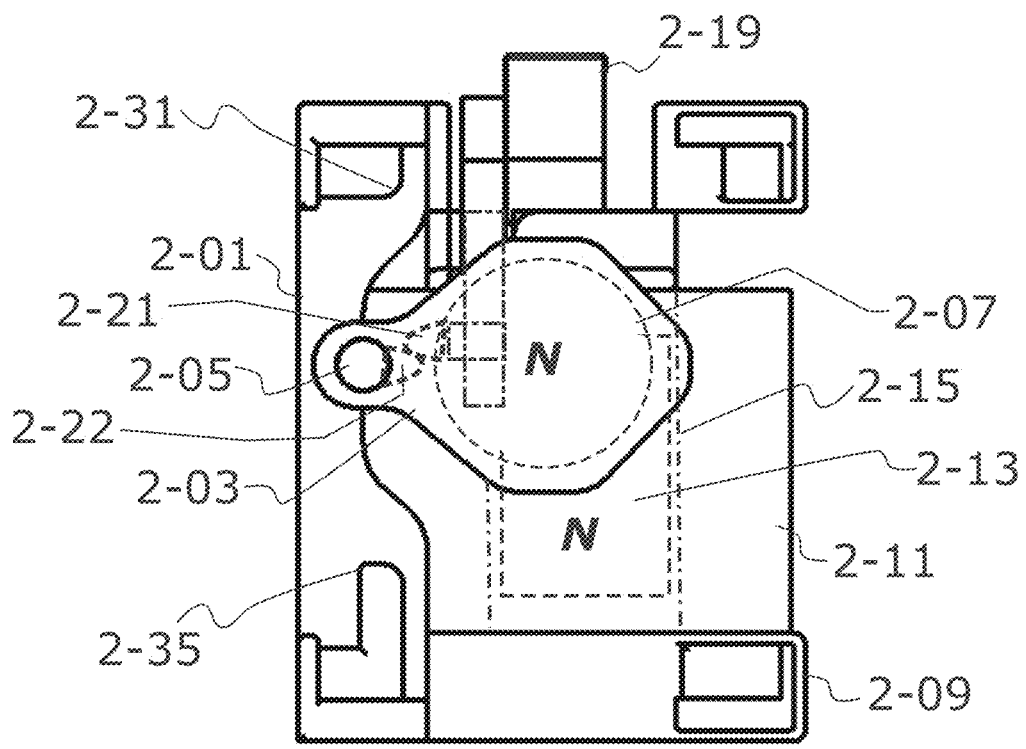
FIG. 3a is a front view of the generator highlighting the magnetic polarity of the axis revolving pendulum energy generating magnet and stationary inner core coil magnet and where the system is in a non-triggered rest state.

The basic operation is that when an external force is applied downward on the trigger plunger sub-system 2-19 & 2-21 the plunger collapses the dual leaf spring 2-17 and as the downward motion increases the trigger transmitter tooth 2-21 comes on mechanical communication with the pendulum receiver trigger tooth 2-22 (shown in FIG. 3a) and this mechanical communication forces the pendulum 2-03, with its disposed and fixed second magnet (disk type) 2-07, to move downward until the plunger trigger tooth 2-21 passes a trigger tooth release point between itself and the pendulum trigger tooth 2-22 (shown in FIG. 3a). After this release point, the plunger tooth and the pendulum triggered tooth cease mechanical communication and the pendulum 2-03 with its disposed second magnet (disk) 2-07 is free to oscillate back up and then down for a plurality of cycles.

Being that there is a first magnet 2-13 in the center of the wound coil 2-11 on its coil bobbin 2-09 the pendulum 2-03 with its disposed second magnet 2-07 hovers proximal over the outer section of the wound coil 2-11 and the two proximal magnets 2-07 & 2-13 are aligned so that their respective magnetic poles are attractive and the resultant magnet flux lines (shown in FIG. 7b) pass through the coil winding 2-11 and are situated (by design) at right angles to the coil wires 2-11. Also, the attractive magnetic fields (shown in FIG. 7b) of the two magnets keep the pendulum 2-03 centered about the coil bobbin 2-09 and along the coil winding 2-11 surface area. Ergo, when the pendulum and its magnet are in oscillating motion caused by the triggering action, Faraday's Law predicts that there will be an acceleration of charge propagating through the coil wires and establishing a voltage difference felt between the two opposite coil winding terminals.

Figure 2B:
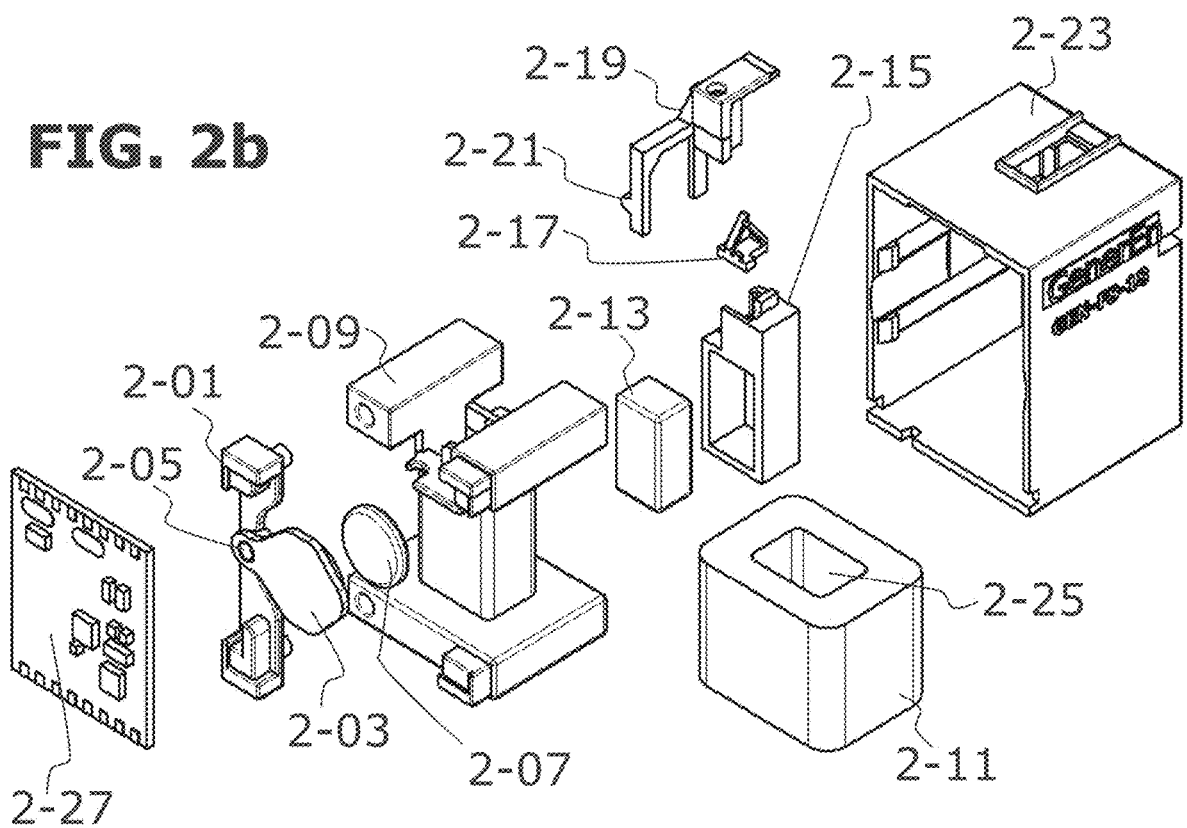
FIG. 2b is an exploded view of the enclosed energy harvesting generator utilized as a battery-less wireless ISM Band transceiver invention showing all internal components including a typical FCC certified ISM Band radio transmitter (e.g. Enocean model PTM-535 ISM Band Radio transmitter module.)

FIG. 2b is an exploded view of all the components that comprise the energy harvesting generator invention that is systematically disposed within the enclosure 2-23 and is in this instance employed be electrically connected to power a typical ISM Band transceiver circuit module 2-27 but not limited to only an ISM Band transceiver module 2-27. Some embodiments may be designed for additionally required power output capabilities by scaling up or scaling down the mechanical, electric (wire gauge), and magnetic values of the system.

Firstly, there is the coil bobbin 2-09 that has wound around its center a coil of copper wire 2-25 and there is inserted and fixed within the center of the coil bobbin 2-09 a first magnet 2-13 that is stationary that is disposed within its enclosure 2-15 and the first magnet enclosure 2-15 is disposed within the center of the coil bobbin 2-09 that has a wound coil of wire 2-11 with the wound coil wire hollow center 2-25 fitted around the coil bobbin 2-09. Fitted and attached by pendulum support's 2-01 top 2-2T and bottom 2-2B plugs, which are inserted and fixed within the coil bobbin's 2-09 top 2-4T and bottom 2-4B plug wells disposed on the left front side of the coil bobbin 2-09 is a pendulum support 2-01. Inserted and fixed with the center of the coil bobbin 2-09 atop the first magnet (bar type) enclosure 2-15 is a non-magnetic metallic dual leaf spring 2-17 that acts as a counter force device to offset the downward force of the triggering action of the control plunger sub-system 2-19 & 2-21 and force the control plunger sub-system 2-19 & 2-21 in the opposite direction of the downward applied operational triggering force. Disposed onto and secured in a free rotational manner on the pendulum support axle 2-05 is the pendulum 2-03 that has disposed on it a second magnet (disk type) 2-07 that is in unison with the pendulum 2-03 and free to rotate whilst the pendulum 2-03 is triggered into rotation about the axle 2-05.

The basic operation is that when an external force is applied downward on the trigger plunger sub-system 2-19 & 2-21 the plunger collapses the dual leaf spring 2-17 and as the downward motion increases the trigger transmitter tooth 2-21 comes on mechanical communication with the pendulum receiver trigger tooth 2-22 (shown in FIG. 3a) and this mechanical communication forces the pendulum 2-03, with its disposed and fixed second magnet (disk type) 2-07, to move downward until the plunger trigger tooth 2-21 passes a trigger tooth release point between itself and the pendulum trigger tooth 2-22 (shown in FIG. 3a). After this release point, the plunger tooth and the pendulum triggered tooth cease mechanical communication and the pendulum 2-03 with its disposed second magnet (disk) 2-07 is free to oscillate back up and then down for a plurality of cycles.

Being that there is a first magnet 2-13 in the center of the wound coil 2-11 on its coil bobbin 2-09 the pendulum 2-03 with its disposed second magnet 2-07 hovers proximal over the outer section of the wound coil 2-11 and the two proximal magnets 2-07 & 2-13 are aligned so that their respective magnetic poles are attractive and the resultant magnet flux lines (shown in FIG. 7b) pass through the coil winding 2-11 and are situated (by design) at right angles to the coil wires 2-11. Also, the mutually attractive magnetic fields (shown in FIG. 7b) of the two magnets keep the pendulum 2-03 centered about the coil bobbin 2-09 and along the coil winding 2-11 surface area. Ergo, when the pendulum and its magnet are in oscillating motion caused by the triggering action, Faraday's Law predicts that there will be an acceleration of charge propagating through the coil wires and establishing a voltage difference felt between the two opposite coil winding terminals.

FIG. 3a is a front view of the generator, sans enclosure, in its non-triggered rest state showing the coil bobbin 2-01 with its four 2-31LT, 2-31RT, 2-LB, & 2-31RB cornered transmitter circuit board insertion regions, where the circuit board is disposed and fixed into position. The coil winding 2-11 is shown and the trigger plunger 2-19 is partially shown. The two magnets 2-13 & 2-07 (dotted lines) with their North Poles aligned in the same plane but distal in position. The pendulum 2-03 with its disk magnet (dotted lines) 2-07 are at center, non-triggered rest position where the trigger plunger 2-19 has its transmitting trigger tooth 2-21 (dotted lines) positioned at rest proximal above the pendulum receiving trigger tooth 2-22 (dotted lines).

Figure 3B:
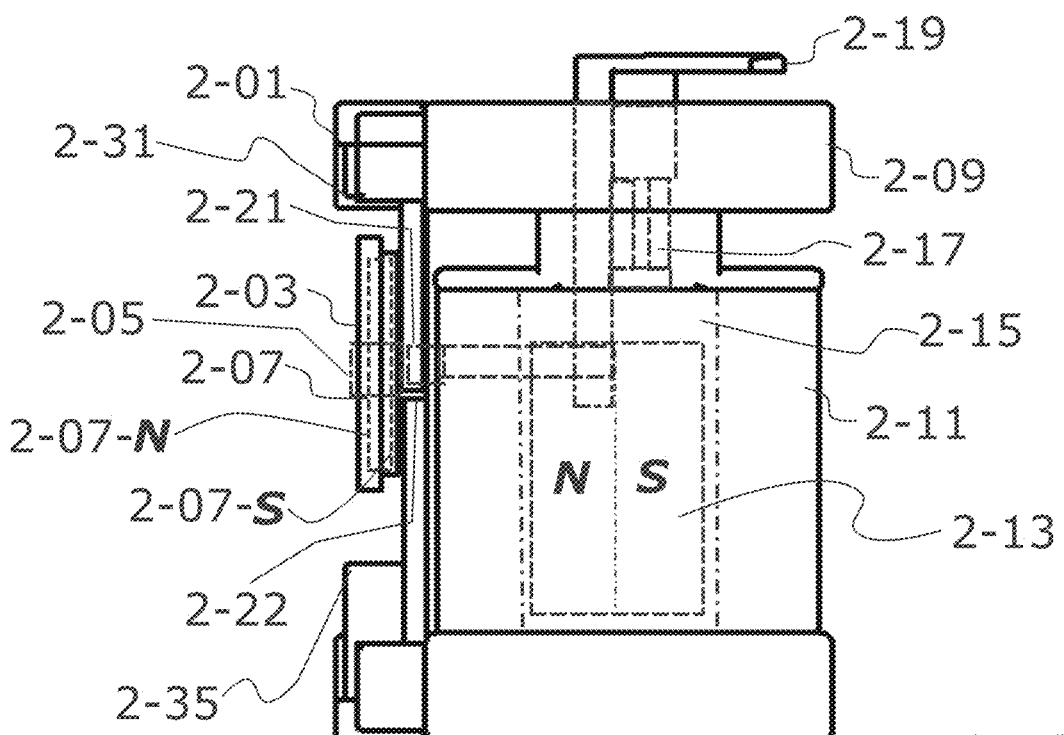
FIG. 3b is a right-side view of the generator highlighting the magnetic polarity of the axis revolving pendulum energy generating magnet and stationary inner core coil magnet and where the system is in a non-triggered rest state.

FIG. 3b is a side view of the generator in its non-triggered rest state, sans enclosure, showing the features of the trigger plunger 2-19 and its transmitter trigger tooth 2-21 (dotted lines) situated above proximal above the pendulum receiver trigger tooth 2-22. (NOTE: The terms transmitter and receiver trigger teeth are definitions for the mechanical transmitting and receiving for communication between the two teeth during a triggering action sequence and not anything to do with electromagnetic radio transmissions). Shown also downward limit stop 2-35 for the pendulum 2-03 oscillatory swing and the upward limit stop is part of the left top circuit insertion region 2-31LT.

FIG. 3b also show the alignment of the attractive ($N_p$ to $S_p$, $N_s$ to $S_s$) magnetic fields between the pendulum magnet ($N_p$, $S_p$) 2-07 and the inner coil core stationary bar magnet ($N_s$, $S_s$).

Figures 7A, 7B:
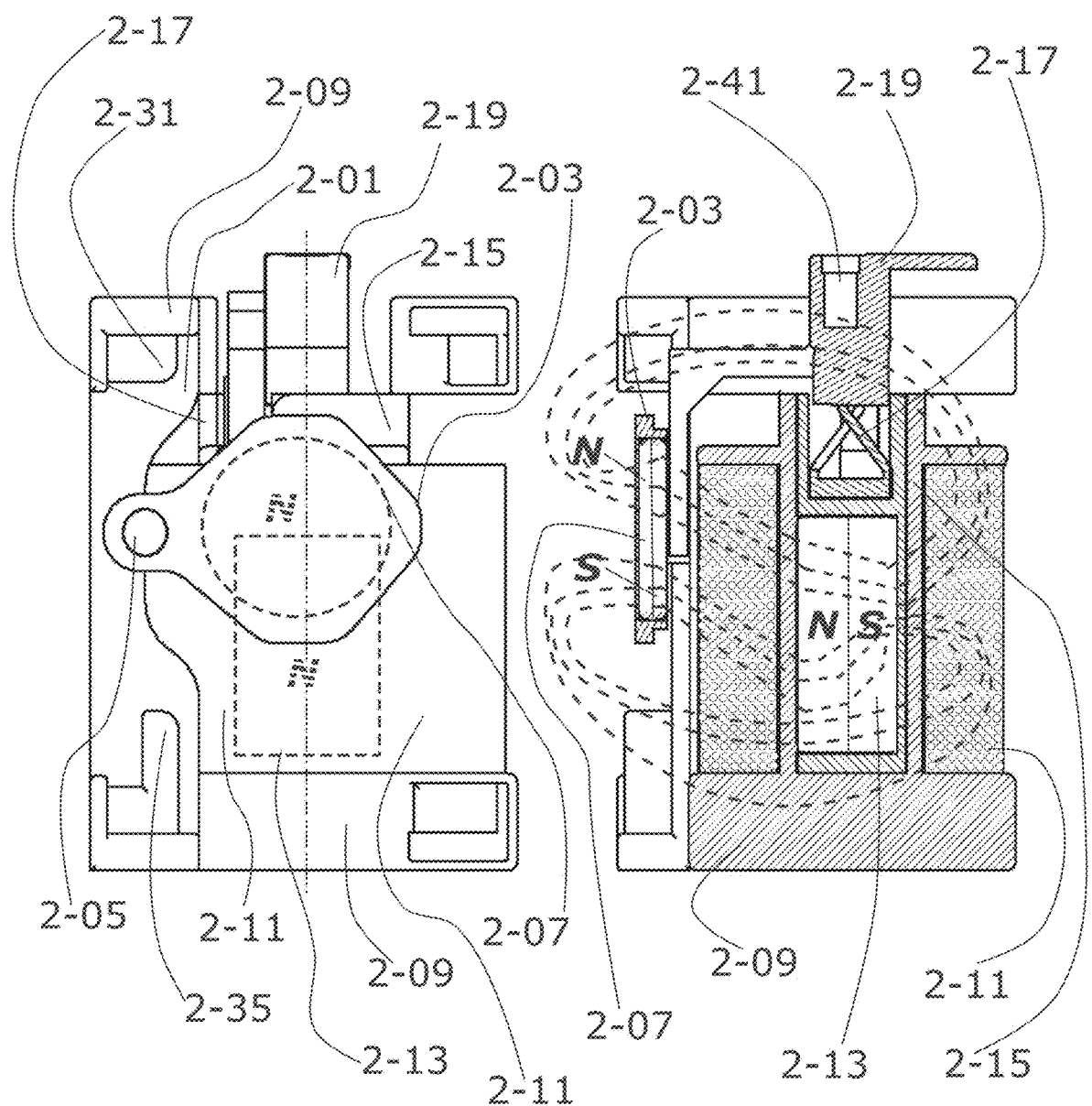
FIG. 7a is a front view of the magnetic system components aligned in its equilibrium rest state before any external triggering action is engaged.
FIG. 7b is a right-side view of the at rest equilibrium state of the interconnecting attractive magnetic flux field between the stationary inner core magnet and the oscillating pendulum magnet.

FIG. 3a & FIG. 3b show the pendulum in the non-triggered rest position that is held in place by the mutually attractive magnetic fields (shown in FIG. 7b).

Figure 4A:
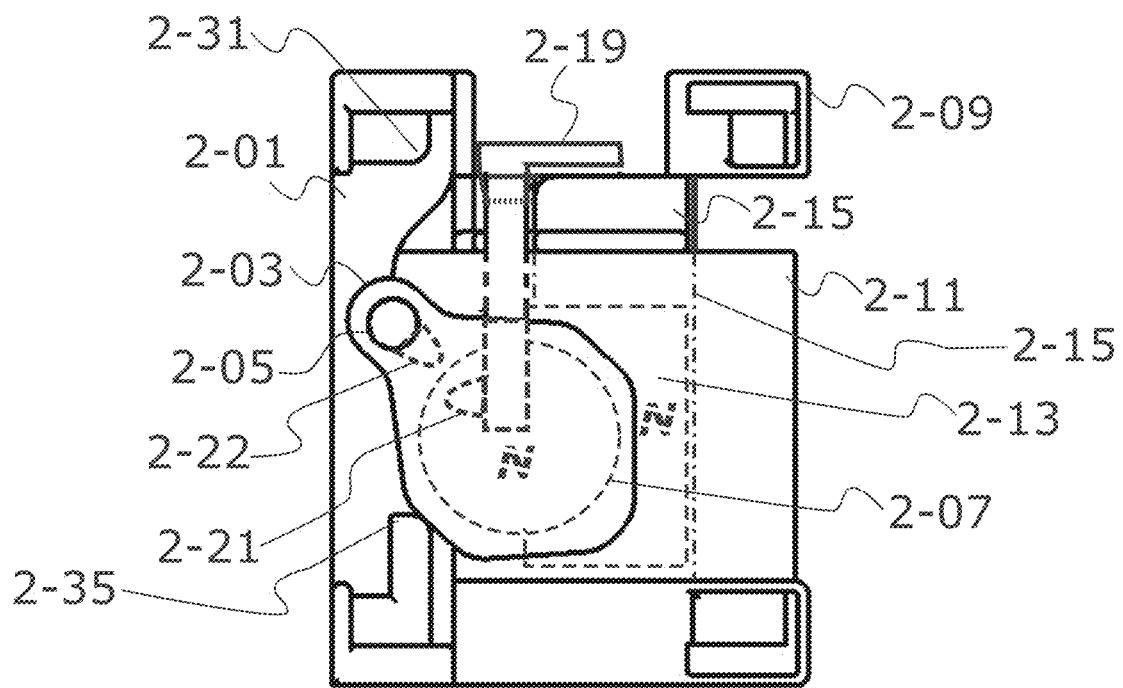
FIG. 4a is a front view of the generator highlighting the magnetic polarity of the axis revolving pendulum energy generating magnet and stationary inner core coil magnet and where the system is in a triggered push down action state and where the pendulum swings through it maximum downward position in the process of returning through a first plurality of harmonic oscillatory motion events.

FIG. 4a is a front view of the generator, sans enclosure, in its initial plunge down triggered actuated state showing the coil bobbin 2-01 with its four 2-31LT, 2-31RT, 2-31 LB, & 2-31RB cornered transmitter circuit board insertion regions, where the circuit board is disposed and fixed into position. The coil winding 2-11 is shown and the trigger plunger 2-19 is partially shown. The two magnets 2-13 & 2-07 (dotted lines) with their North Poles aligned in the same plane but distal in position. The pendulum 2-03 with its disk magnet (dotted lines) 2-07 are at center, non-triggered rest position where the trigger plunger 2-19 has its transmitting trigger tooth 2-21 (dotted lines) positioned at distal below the pendulum receiving trigger tooth 2-22 (dotted lines).

Figure 4B:
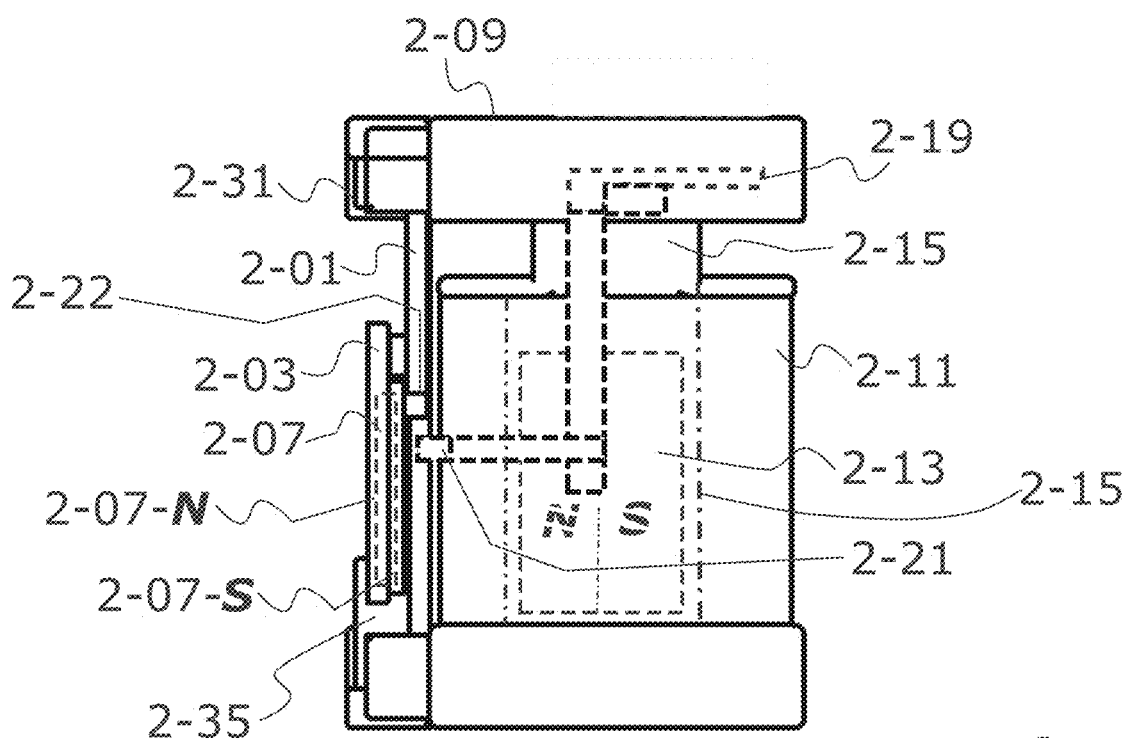
FIG. 4b is a right-side view of the generator highlighting the magnetic polarity of the axis revolving pendulum energy generating magnet and stationary inner core no coil magnet and where the system is in a triggered push down action state and where the pendulum swings through it maximum downward position in the process of returning through a first plurality of harmonic oscillatory motion events.

FIG. 4b is a side view of the generator in its initial plunge down triggered actuated state, sans enclosure, showing the features of the trigger plunger 2-19 and its transmitter trigger tooth 2-21 (dotted lines) situated below distal from the pendulum receiver trigger tooth 2-22. (NOTE: The terms transmitter and receiver trigger teeth are definitions for the mechanical transmitting and receiving for communication between the two teeth during a triggering action sequence and not anything to do with electromagnetic radio transmissions). Also shown is the pendulum that has moved to its maximum downward limit stop 2-35 for the pendulum 2-03 oscillatory swing and consequently will move proximal to the upward limit stop but without touching it due to frictional losses. The upper limit stop is part of the left top circuit insertion region 2-31LT. In this downward actuated triggered state, the plunger 2-19 is depressed downward to its maximum limit fully compressing the dual leaf spring (shown in FIG. 2a & FIG. 2b)

FIG. 4b also show the alignment of the attractive ($N_p$ to $S_p$, $N_s$ to $S_s$) magnetic fields between the pendulum magnet ($N_p$, $S_p$) 2-07 and the inner coil core stationary bar magnet ($N_s$, $S_s$).

FIG. 4a & FIG. 4b show the pendulum in the initial plunge down triggered actuated position is no longer held in place by the mutually attractive magnetic fields (shown in FIG. 7b) because of the externally applied force overcoming the magnetic force of attraction.

Figure 5A:
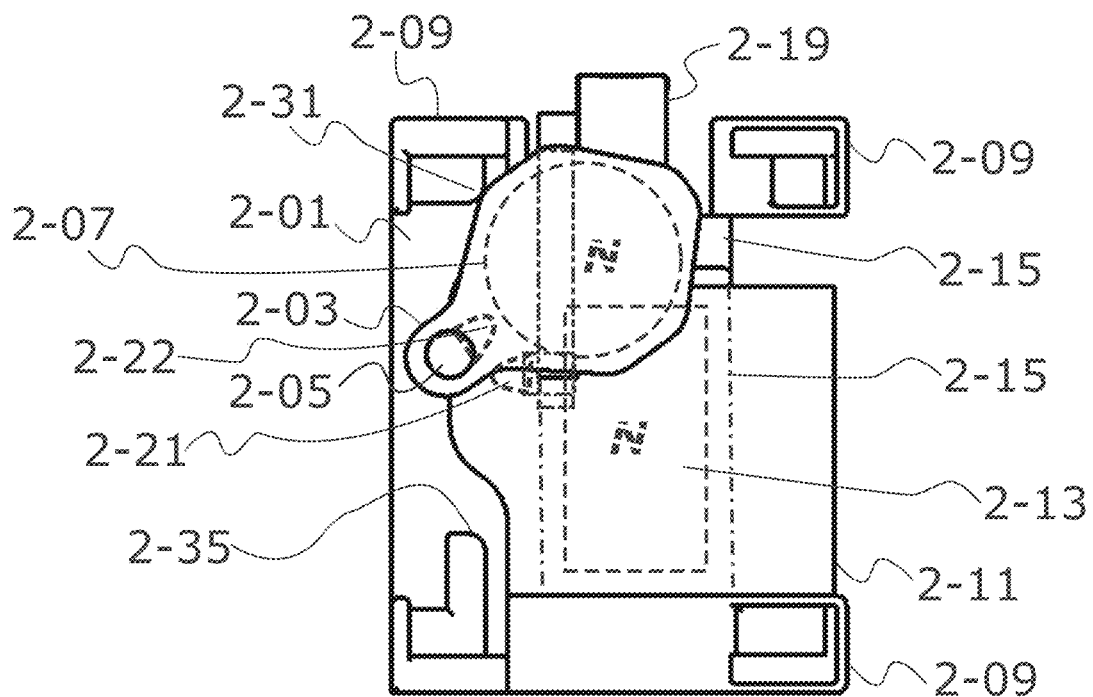
FIG. 5a is a front view of the generator highlighting the magnetic polarity of the axis revolving pendulum energy generating magnet and stationary inner core coil magnet and where the system is in a release-triggered pull-up action state and where the pendulum swings through it maximum upward position in the process of returning through a second plurality of harmonic oscillatory motion events.

FIG. 5a is a front view of the generator, sans enclosure, in its initial return plunge up triggered actuated state showing the coil bobbin 2-01 with its four 2-31LT, 2-31RT, 2-31 LB, & 2-31RB cornered transmitter circuit board insertion regions, where the circuit board is disposed and fixed into position. The coil winding 2-11 is shown and the trigger plunger 2-19 is partially shown. The two magnets 2-13 & 2-07 (dotted lines) with their North Poles aligned in the same plane but distal in position. The pendulum 2-03 with its disk magnet (dotted lines) are at center, plunge upward triggered return actuated position where the trigger plunger 2-19 has its transmitting trigger tooth 2-21 (dotted lines) positioned at distal location above the pendulum receiving trigger tooth 2-22 (dotted lines).

Figure 5B:
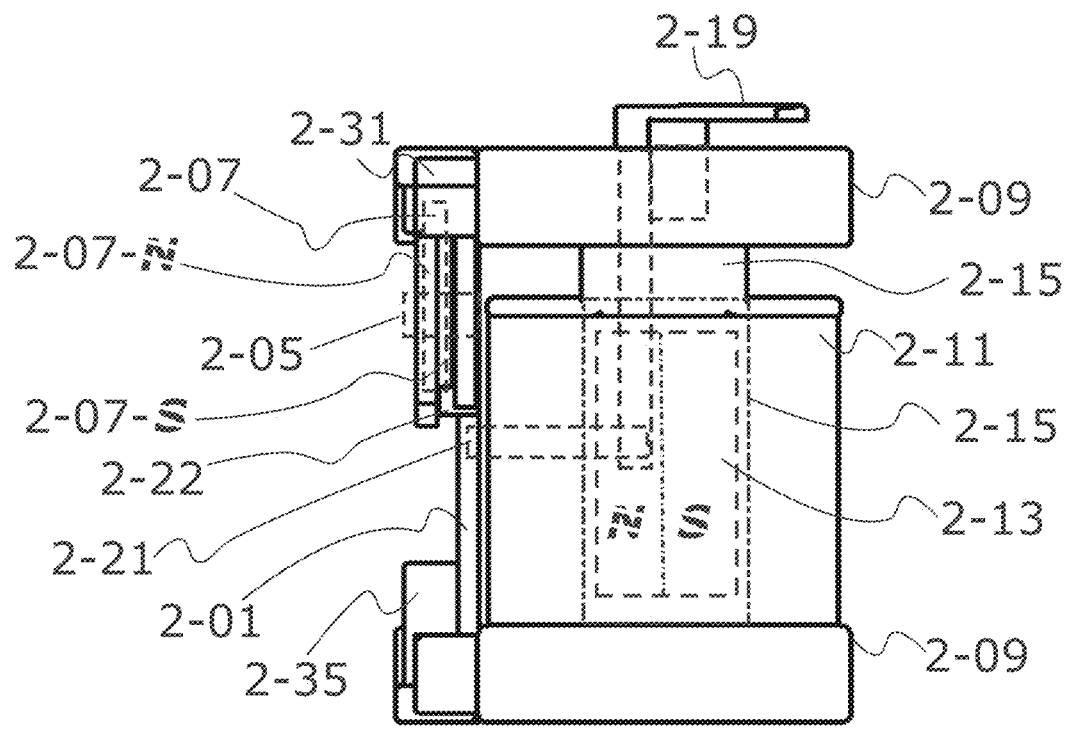
FIG. 5b is a right-side view of the generator highlighting the magnetic polarity of the axis revolving pendulum energy generating magnet and stationary inner core coil magnet and where the system is in a release-triggered pull-up action state and where the pendulum swings through it maximum upward position in process of returning through a second plurality of harmonic oscillatory motion events.

FIG. 5b is a side view of the generator in its initial return plunge up triggered actuated state, sans enclosure, showing the features of the trigger plunger 2-19 and its transmitter trigger tooth 2-21 (dotted lines) situated distal above the pendulum receiver trigger tooth 2-22. (NOTE: The terms transmitter and receiver trigger teeth are definitions for the mechanical transmitting and receiving for communication between the two teeth during a triggering action sequence and not anything to do with electromagnetic radio transmissions). Also shown is the pendulum that has moved to its maximum upward limit stop 2-35 for the pendulum 2-03 oscillatory swing and consequently will move proximal to the upward limit stop but without touching it due to frictional losses. The upper limit stop 2-31 is part of the left top circuit insertion region 2-31LT. In this plunge up actuated triggered state, the plunger 2-19 is released upward, due to an externally release of the applied downward force to its maximum limit fully decompressing the dual leaf spring (shown in FIG. 2a & FIG. 2b) FIG. 5b also show the alignment of the attractive ($N_p$ to $S_p$, $N_s$ to $S_s$) magnetic fields (shown in FIG. 7b) between the pendulum magnet ($N_p$, $S_p$) 2-07 and the inner coil core stationary bar magnet ($N_s$, $S_s$).

FIG. 5a & FIG. 5b show the pendulum 2-03 in the plunge up triggered deactivated position that is released to its maximum up limit stop 2-31 by overcoming the force of the mutually attractive magnetic fields (shown in FIG. 7b).

FIG. 6a is a rear angular view of the components comprising the triggering sub-system of the invention identifying in detail the following functional components of the triggering sub-system. There is the first magnet 2-13, a bar type, disposed within the magnet compartment 2-15 and positioned and fixed on top of the magnet compartment is the dual leaf spring that is utilized as a means for launching the plunger 2-19 and its trigger tooth section 2-21 (that is part of the plunger 2-19) upward after an externally applied downward force on the plunger 2-19 & 2-21 is withdrawn. The dual downward and upward vertical motion of the plunger and its transmission trigger tooth is caused by the instant push down and release up of the plunger by some externally applied force (e.g. a human hand or robotic push piston solenoid) It is illustrated in FIG. 6a, FIG. 6b, and FIG. 6c the attractive polarity between the stationary magnet 2-13 and the rotatable disk magnet 2-07 with a North to South pole penetration through the coil windings. This FIG. 6a shows the trigger system at rest in a magnetic equilibrium state prior to external triggering.

FIG. 6b is a top frontal perspective view of the components comprising the triggering sub-system of the invention identifying in detail the following functional components of the triggering sub-system. Substantially visible is the trigger plunger 2-19 that is disposed and movable through the stationary first magnet 2-13 enclosure compartment 2-15. Also shown is the plunger 2-03 with its disposed disk second magnet 2-07 (seen as dotted circle) and its support components that include the support bar 2-01 upper maximum stop, 2-31 pendulum axle, 2-05 lower maximum stop, 2-35 and the two plugs comprised of the top plug 2-37 and the bottom plug 2-39 that are inserted and fixed within the two receiving blind hole plug insert wells 2-43 & 2-45 (receiving wells shown in FIG. 6d).). It is illustrated in FIG. 6a, FIG. 613, and FIG. 6c the attractive polarity between the stationary magnet 2-13 and the rotatable disk magnet 2-07 with a North to South pole penetration through the coil windings. This FIG. 613 shows the trigger system at rest in a magnetic equilibrium state prior to external triggering.

FIG. 6c is a top frontal perspective view of the components comprising the triggering sub-system of the invention identifying in detail the following functional components of the triggering sub-system. Substantially visible is the trigger plunger 2-19 that is disposed and movable through the stationary first magnet 2-13 enclosure compartment 2-15. Also shown is the plunger 2-03 with its disposed disk second magnet 2-07 (seen as dotted circle) and its support components that include the support bar 2-01 upper maximum stop, 2-31 pendulum axle, 2-05 lower maximum stop, 2-35 and the two plugs comprised of the top plug 2-37 and the bottom plug 2-39 that are inserted and fixed within the two receiving blind hole insert wells 2-43 & 2-45 (receiving wells shown in FIG. 6d).). It is illustrated in FIG. 6a, FIG. 6b, and FIG. 6c the attractive polarity between the stationary magnet 2-13 and the rotatable disk magnet 2-07 with a North to South pole penetration through the coil windings. This FIG. 6c shows the trigger system at rest in a magnetic equilibrium state prior to external triggering.

FIG. 6d is a top frontal perspective view showing the coil bobbin 2-09 with its labeled features of a front left side top insert plug blind hole well 2-43 and a front left bottom insert blind hole plug well 2-45.

FIG. 7a is a front view of the basic generator showing the aligned attractive placement of the pendulum 2-03 magnet 2-07 and both are simultaneously rotatable through the pendulum's upper travel stop 2-31 and its lower travel stop 2-35. Facing the view shows, by dotted lines, the pendulum 2-03 magnet 2-07 with the tow magnets North poles facing the viewer. The magnets 2-07 & 2-13 are in parallel planes distal to each other and is a non-triggered rest state of equilibrium.

FIG. 1b is a left side view of the basic generator showing the interactive magnetic flux lines of force FL1 & FL2 of attraction between the rotatable pendulum 2-03 magnet 2-07 and the stationary magnet 2-13 and these attractive magnetic flux lines of force penetrate the coil winding 2-11 and the illustration represents the position of the pendulum 2-03 and its corresponding magnet 2-07 in its rest state of equilibrium, prior to external triggering. (i.e. The illustration of the magnetic flux lines of force is a limited condensed version and considering that the flux lines are emanating all through the generator system to infinity and whose intensity is governed by the inverse cube law.)

Figures 8A, 8B:
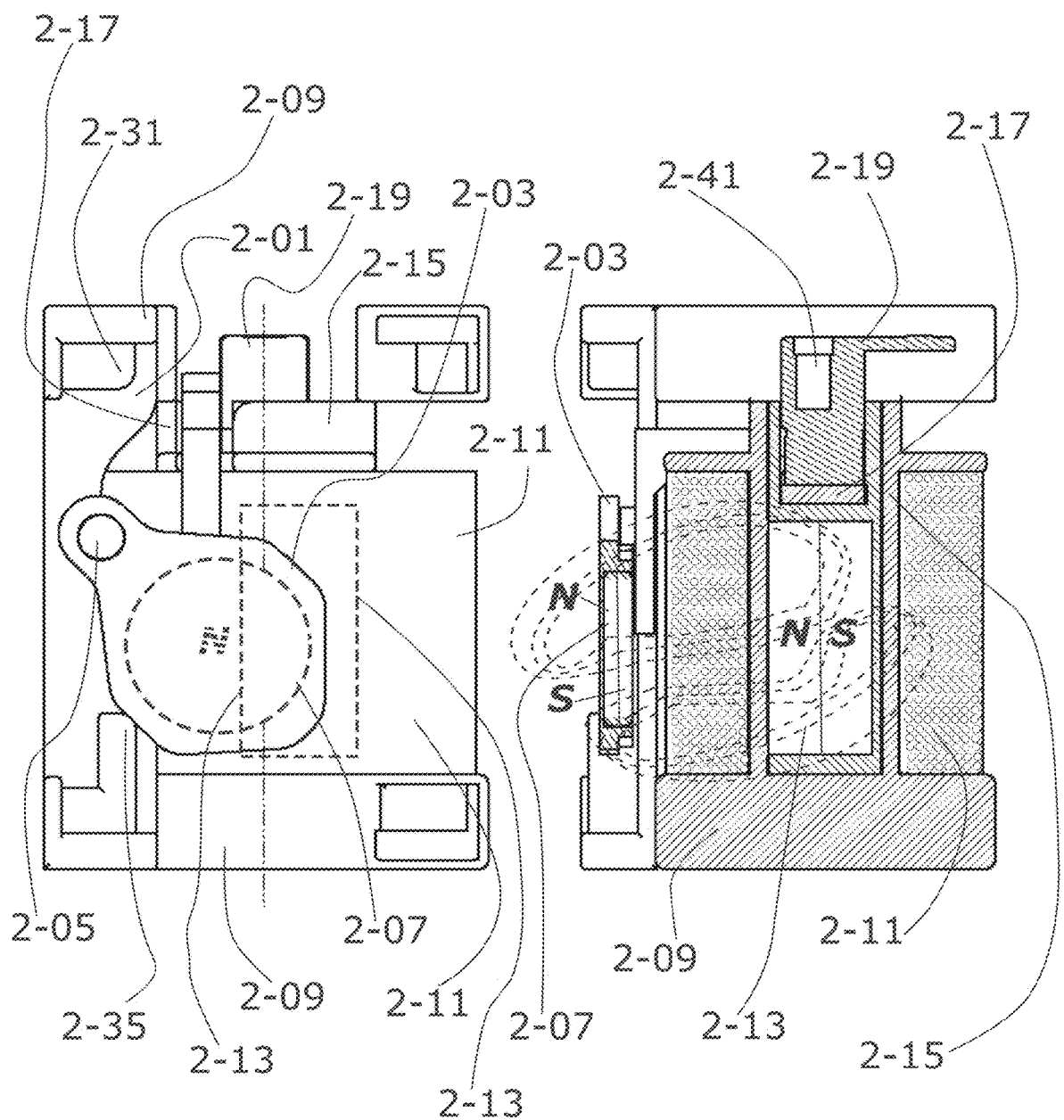
FIG. 8a is a front view of the magnetic system components in its active downward triggered repositioned oscillating pendulum magnet.
FIG. 8b is a right-side view, of the magnetic system components, in its active downward triggered repositioned pendulum magnet's attractive magnetic flux field, between the stationary inner core magnet and the oscillating pendulum magnet.

FIG. 8a is a front view of the basic generator showing the aligned attractive placement of the pendulum 2-03 magnet 2-07 and both are simultaneously rotatable through the pendulum's upper travel stop 2-31 and its lower travel stop 2-35. Facing the view shows, by dotted lines, the pendulum 2-03 magnet 2-07 with the tow magnets North poles facing the viewer. The magnets 2-07 & 2-13 are in parallel planes and now angular distal to each other and is an initial push down triggered state by an applied external force that caused the action of the pendulum 2-03 and its corresponding disk magnet to reach its lower stop limit 2-35. During this time, the trigger transmission tooth 2-21 is freed from communicating with the pendulum receiving tooth 2-22 (shown in FIG. 6a)

FIG. 8b is a left side view of the basic generator showing the interactive magnetic flux lines of force FL1 & FL2 of attraction between the rotatable pendulum 2-03 magnet 2-07 and the stationary magnet 2-13 and these attractive magnetic flux lines of force penetrate the coil winding 2-11 and the illustration represents the position of the pendulum 2-03 and its corresponding magnet 2-07. The magnets 2-07 & 2-13 are in parallel planes and now angular distal to each other and is an initial push down triggered state by an applied external force that caused the action of the pendulum 2-03 and its corresponding disk magnet to reach its lower stop limit 2-35. During this time, the trigger transmission tooth 2-21 is freed from communicating with the pendulum receiving tooth 2-22 (shown in FIG. 6a). (i.e. The illustration of the magnetic flux lines of force is a limited condensed version and considering that the flux lines are emanating all through the generator system to infinity and whose intensity is governed by the inverse cube law.)

Figures 1, 9:
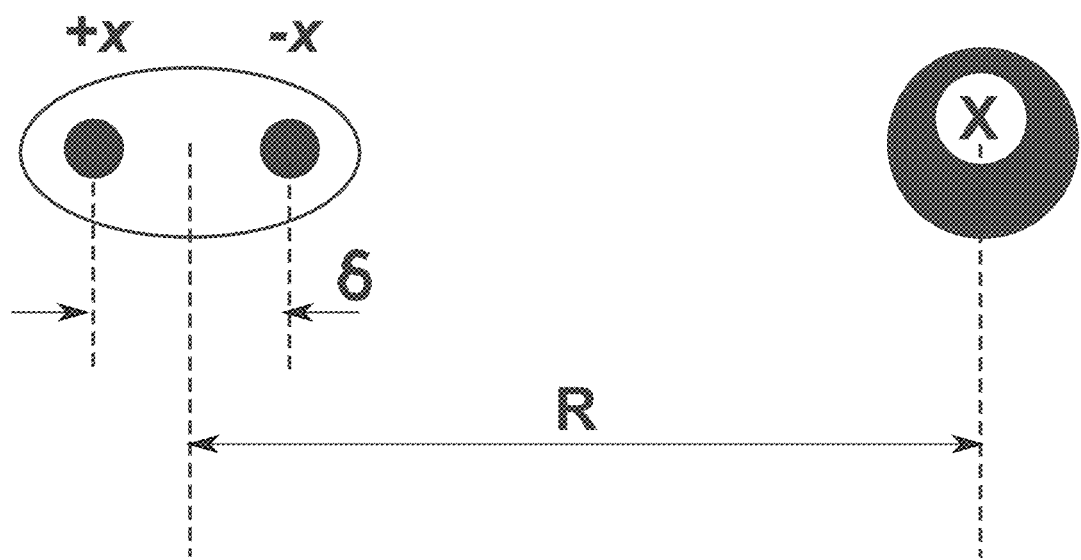
FIG. 9-1-1 is a diagram of the dipole that is made up of two opposite entities and −x separated by a distance δ, acted at a much larger distance R by the point entity +X.
Figures 9A, 9B:
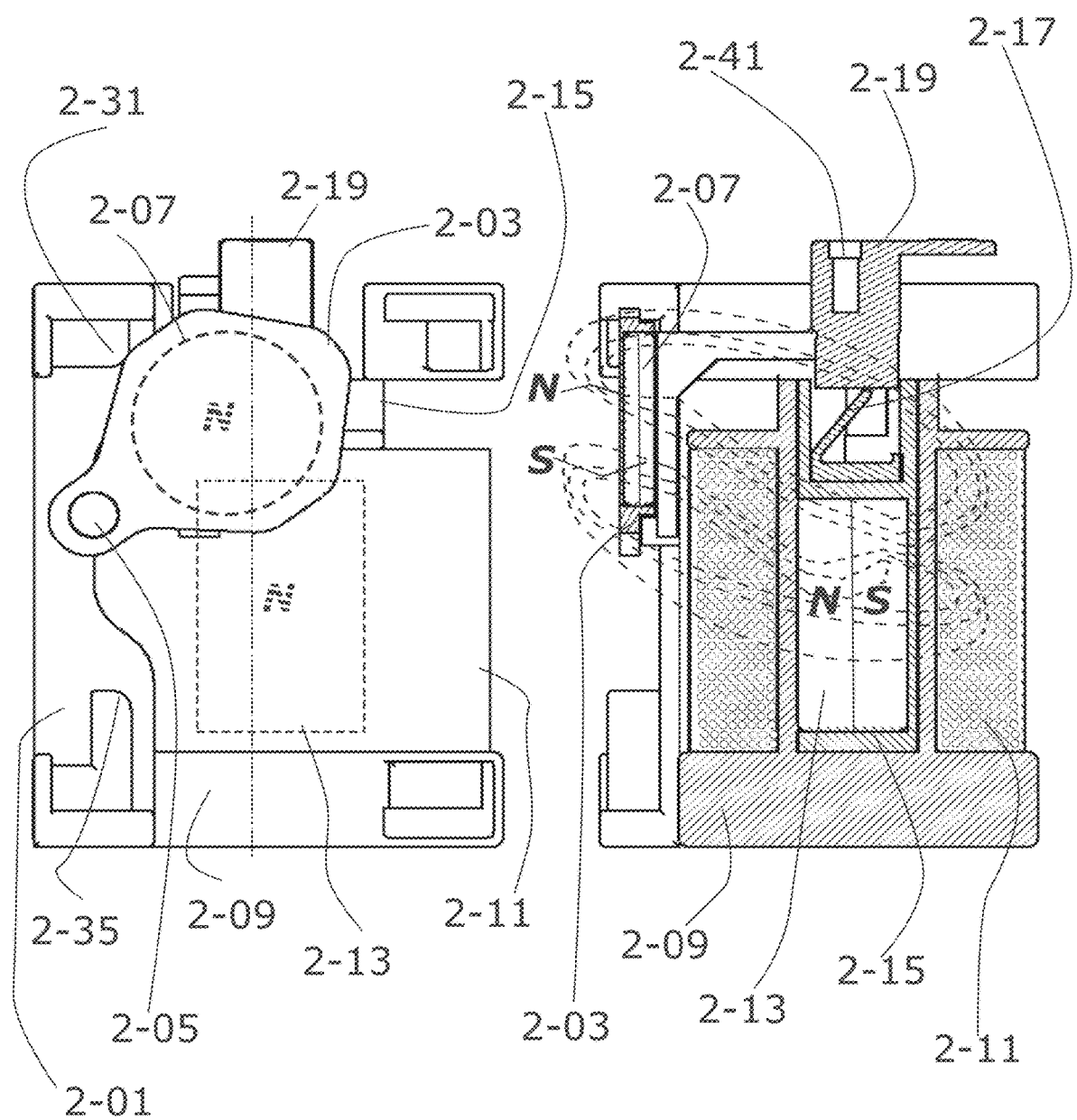
FIG. 9a is a front view of the magnetic system components illustrating its active upward retriggered, repositioned oscillating pendulum magnet.
FIG. 9b is a right-side view of the view of the magnetic system components illustrating its active upward retriggered repositioned pendulum magnet's attractive magnetic flux field between the stationary inner core magnet and the oscillating pendulum magnet.

FIG. 9a is a front view of the basic generator showing the aligned attractive placement of the pendulum 2-03 magnet 2-07 and both are simultaneously rotatable through the pendulum's upper travel stop 2-31 and its lower travel stop 2-35. Facing the view shows, by dotted lines, the pendulum 2-03 magnet 2-07 with the tow magnets North poles facing the viewer. The magnets 2-07 & 2-13 are in parallel planes and now angular distal to each other and is an initial plunge up triggered state by the release of an applied external force that caused the action of the pendulum 2-03 and its corresponding disk magnet to reach its upper stop limit 2-31. During this time, the trigger transmission tooth 2-21 is freed from communicating with the pendulum receiving tooth 2-22 (shown in FIG. 6a)

FIG. 9b is a left side view of the basic generator showing the interactive magnetic flux lines of force FL1 & FL2 of attraction between the rotatable pendulum 2-03 magnet 2-07 and the stationary magnet 2-13 and these attractive magnetic flux lines of force penetrate the coil winding 2-11 and the illustration represents the position of the pendulum 2-03 and its corresponding magnet 2-07. The magnets 2-07 & 2-13 are in parallel planes and now angular distal to each other and is an initial plunge up triggered state by the release of an applied external force that caused the action of the pendulum 2-03 and its corresponding disk magnet to reach its upper stop limit 2-31. During this time, the trigger transmission tooth 2-21 is freed from communicating with the pendulum receiving tooth 2-22 (shown in FIG. 6a). (i.e. The illustration of the magnetic flux lines of force is a limited condensed version and considering that the flux lines are emanating all through the generator system to infinity and whose intensity is governed by the inverse cube law.)

The Dynamics of Magnetic Field Effects

The following treatise relates to and is a detailed description of the interactive dynamic actions of the interacting magnetic fields of the stationary magnet 2-13 disposed within its compartment that is disposed in the center of the coil bobbin 2-09 and the rotatable pendulum disk magnet 2-07 that is disposed in the pendulum 2-03; all in FIG. 7b, FIG. 8b, and FIG. 9b:

Countless variations leading to prior art of granted patents for generators and motors, based on the principle of electromagnetic induction, have displayed in their workings that moving a magnet through a coil or moving a coil past a magnetic field, and in both cases the right hand rule, also the sine function, predicts the amount of electromotive force (induced voltage) is maximum during the time that the magnetic lines of force are in motion at +/−90° (perpendicular) to the coil winding. The mathematical sign of the right angle is either the velocity function or its complex conjugate for forward and reverse movement of the coil or the magnet in all instances; and further the magnetic force relationship erroneously is described by relating to the inverse square law, where in fact this is only true at atomic distances. When Special Relativity is utilized in calculations at a macro scale as with the force between two magnets, the inverse cube law prevails in proper calculations because this deals with dipoles and not point charges that are the inner workings of dipoles.

It is unfortunate that the inverse cube law is still somewhat esoteric to most. There are many papers published in which scientists have spent considerable time, effort, and funds, to explain experimentally confirmed inverse cube dependency for cases in which according to the simple laws based on point entities, should instead have given an inverse square dependency. The simple mathematical analysis included here will hopefully avoid such waste of resources in the future and teach that the present invention utilizes this inverse cube law to explain the novelty of the present embodiments of the invention.

We learn that the force between two charges, two magnetic monopoles, or two masses all follow an inverse square law, however, most of the time, the scientific reader is not made aware of an important assumption, that of being able to model these entities as point objects; which Maxwell's equations also ascribe to.

If the entities cannot be reduced to a point, then, the inverse square laws cannot be applied. It can be shown mathematically that the inverse square law changes into an inverse cube law approximation for the case of dipoles.

In practice, a physicist finds that most of real-life applications cannot be modeled by point entities, but only by dipoles. These dipoles are commonly met in dielectrics, magnets, and molecules. In magnetism, nobody has yet identified a magnetic particle which can be defined as a point monopole. AH physical magnets to date are in fact known to consist of dipoles having a north and a south pole and their force field will therefore always follow the inverse cubed law for dipoles. Same applies to charges acting on electric dipoles, and one cannot exclude the theoretical possibility of the same applying to mass dipoles.

Mathematical Derivation of the Inverse Cubed Law

This derivation theoretically applies to all forces, which obey the inverse square law when applied to point entities (FP).

Electrostatic Force: FP=K(Q1×Q2)/R2 . . . K=¼πεO, Q=charge, R=distance Magnetic Force: FP=U(m1×m2)/R2 . . . U=1/μ, m=magnetic monopoles strength, R=distance Gravitational Force: FP=G(M1×M2)/R2 . . . G=gravitational constant, M=mass, R=distance So, in general FP=k (X1×X2)/R2 where FP=force magnitude for point entities, k=constant, X=entity unit,

R=distance between entities.

Now defined is an additional parameter δ which in practice is a short distance between two-point entities forming a single dipole.

Distance R will therefore define the much longer distance between the centre of the dipole and another point entity X.

FIG. 9-1-1 is a diagram of the dipole that is made up of two opposite entities +x and −x separated by a distance δ, acted at a much larder distance R by the point entity +X. Since the negative part of the dipole is attracted to +X, the dipole will orientate itself with the negative side facing +X point entity. Thus if we measure distance R from the centre point of the dipole to point we find that the distance from +X to +x is R+δ/2 and that from +X to −x is R−δ/2. Therefore, since the distance between +X and −x is shorter than that between +X and +x, the force polarity between two opposite entities will govern the motion of the dipole with respect to the point entity. For opposite charges and magnetic poles, this means that a dipole will always move toward point +X, independently of the polarity of X.

The net force (FD) acting between the dipole and point entity X will be:

$$FD=k(X\{x/(R-\delta/2)2\})-k(X\{x/(R+\delta/2)2\}) \qquad (eq. 1)$$

we can rewrite the above in the form:

$$FD = [k\{X(x/R2)\}]/(1-\delta/2R)2 - [k\{X(x/R2)\}]/(1+\delta/2R)2 \quad (eq. 2)$$

For the condition $\delta \ll 2R$, which was set as one of our assumptions, we are justified to apply the binomial approximation:

$$(1+x)n \approx 1+nx, \text{ or } 1/(1+x)n = (1+x)-n \approx 1-nx, \text{ valid for } x \ll 1. \quad (eq. 3)$$

This reduces: $1/(1-\delta 2R)2 = (1-\delta/2R)-2$ to $1+\delta/R$, (eq. 4)

and $1/(1+\delta/2R)2 = (1+\delta/2R)-2$ to $1-\delta/R$ (eq. 5)

The force field equation can therefore be approximated as:

$$FD \approx [k\{X(x/R2)\}](1+\delta/R) - [k\{X(x/R2)\}](1-\delta/R) \quad (eq. 6)$$

$$FD \approx [kX(x/R2)](1+\delta/R - 1+\delta/R) \quad (eq. 7)$$

$$FD \approx 2k[(X(x\delta/R3)] \text{ or simply } FD\alpha 1/R3 \quad (eq. 8)$$

As is obvious from the above mathematical analysis, the simple inverse square law relation given for point charges, magnetic monopoles or point masses does NOT apply for the simple dipole case, for which the inverse cube law must be applied. It is also shown that the force vector between a dipole and a point entity is always the same polarity as that given for two opposite polarity point entities, which in general is defined as an attractive force.

All static dipolar fields drop off as the inverse cube of distance (Gauss's Law) once it gets much further away than the distance between the two poles of the dipole. It can thought of as being the case because the monopole fields of the two poles cancel each other "to first order".

By the same token, the quadrupole field (from two opposite dipoles right next to each other) drops off as the inverse 4th power of distance, because the two dipoles cancel each other to first order; and so on.

(i.e. The following FIGS. 10 through 16 are illustrations and representation graphics for the additional embodiments of the invention utilizing a single simple pendulum system and suggested for the consumer, commercial OEM and industrial OEM markets.)

FIG. 10a is an exploded view of another embodiment for a dual push button remote control battery-less wireless switch transmitter system that has components of the following; an enclosure box 10-01 that has organized and disposed within the assembled generator components comprised of a coil bobbin 10-11 with a coil wire winding 10-09 centered around the coil bobbin 10-11 and where there is disposed within the center of the coil bobbin 10-11, a slab magnet 10-13 that is stationary and fixed within the center. In mechanical communication with and disposed and attached to the coil bobbin 10-11 is 8movable sliding trigger bar 10-21 disposed and mated on the substrate 10-21 where it is free to slide left and right of a center position. Further, a left first spring 10-35 loaded plunger 10-27 that has disposed on a left perpendicular rod arm 10-27Ira (perpendicular to the plunger vertical up and down motion), and disposed along this left perpendicular rod arm 10-27Ira is a left position roller 10-31 and it is free to rotate about the left perpendicular rod arm axis 10-27ax. Then there also is a right second spring 10-25 loaded plunger 10-33 that has disposed on a right perpendicular rod arm 10-33Ira (perpendicular to the plunger vertical up and down motion), and disposed along this right perpendicular rod arm 10-33Ira is a right position roller 10-29 and it is free to rotate about the right perpendicular rod arm axis 10-33ax. The left plunger 10-27 is disposed in its left associated blind hole guide well 10-69L (shown in FIG. 13a) and the left plunger 10-27 is free to move vertically down and up, whilst under the mechanical influence of its associated spring 10-35. Also, the right plunger 10-33 is disposed in its right associated blind hole guide well 10-69R (shown in FIG. 13a) and the right plunger 10-33 is free to move vertically down and up, whilst under the mechanical influence of its associated 10-7 spring 10-25. Both left plunger 10-27 and right plunger 10-33 are free to move vertically down and up within their respective blind hole plunger wells (acting as plunger travel guides) 10-69L and 10-69R, as well as their associated left and right springs 10-35 and 10-25 that are inserted and disposed within their respective blind hole guide wells (acting as spring travel guides) 10-69L and 10-69R. As all of the above mentioned components are assembled together a top cover is disposed on top of the enclosure box 10-01 and this enclosure box has two through holes 10-2 and 10-4 that accommodate the two plungers 10-27 and 10-33 to move down and up through the top cover through holes 10-2 and 10-4 freely with no mechanical interference for the plunger travel length down and up. Both the plungers 10-27 & 10-33 and the plunger guide through holes 10-2 & 10-4 on the top cover 10-03 are keyed with a semicircular pattern for proper fitting and prevention of any unwanted rotational motion during the plunging travel sequence.

FIG. 10b is a top perspective view of another embodiment for the invention that is utilized as a slide switch generator for a slide action battery-less and wireless control switch using the same components of those shown in FIG. 10a and includes a leaf spring 10-23 (shown in FIG. 10a) that functions as a side to side flipflop spring position lock for the sliding sequence. There is a slide control handle 10-43 is inserted through the slide top cover 10-41 through hole 10-14 and this slide control handle is disposed and attaches to the slide bar 10-21 (shown in FIG. 10a) for smooth sliding up and down n-off) control functions.

FIG. 10c shows top perspective views of two additional embodiments of the invention being utilized as a rocker style battery-less and wireless remote control switch, illustrating the left components are for utilizing all the components of those shown in FIG. 10a with a bespoke top cover 10-37 for being utilized for a rocker type switch function. The top cover 10-37 has two opposite keyed holes as with the top cover shown in FIG. 10a with an additional two featured components of snap-in rod locks 10-& 10-12 that secures the rocker rod 10-28 (shown in FIG. 16c1) disposed under the rocker see-saw control 10-39. The rocker see-saw control 10-39 is free to rock forth and back (on and off) by the action of its axial motion about the axis of rocker see-saw control rod 10-28 (in FIG. 16a), situated under the rocker control that is snapped-in to the two snap secure finger type catches 10-10 & 10-12 for the rocker rod 10-28. The axis (imaginary) of the rocker rod 10-28 and the axis (imaginary) of the snap secure finger type catches 10-10 & 10-12 have their axis (imaginary) mated parallel with zero displacement difference. The operation of forth and back rocking control action has the rocker see-saw control 10-39 opposite rocker ends periodically coming in mechanical communication with the two plunger rods 10-27 & 10-33 shown in FIG. 10a and this action operates the plungers (push down-pop up action) going into and coming out of the keyed plunger through holes 10-6 & 10-8 situated at opposite ends of the bespoke top cover 10-37. A switch action with the rocker attachments 10-39 in a first instance has the one end 10-39a of the rocker control 10-39 being pushed downward by an external applied force (a human finger or robotic finger mechanism) enough so that the rocker end 10-39a comes in mechanical communication with plunger 10-27 (shown in FIG. 16*a*) and this plunger 10-27 travels inward and this action slides the control axle slide bar 10-21 shown FIG. 16*e* to slide to a first side movement position limit by having the plunger's 10-27 roller 10-31 rotationally communicate a vectoral force perpendicular to the instant vectoral vertical downward motion of the plunger 10-27. Instantly the additional action is for the control axle slide bar 10-21 that is guided in movement by it being secured and movable through the axle slide bar finger type catch guides 10-59L & 10-59R that are part of the slide bar substrate 10-19. This additional action now forces by opposite roller 10-29 on opposite plunger 10-33 to force the plunger 10-33 upward through the top cover opposite through hole 10-4 and it now has mechanical communication with the rocker's opposite end 10-39*b* thus being able to force upward, the rocker control 10-39.

The second set of bespoke features in FIG. 10*c* are the components comprising a dual push-button remote-control battery-less and wireless switch with a bespoke top cover 10-03 and has disposed on opposite ends two keyed through holes 10-2 & 10-4 for plunger travel and where there are two push control buttons 10-05 & 10-07. A similar action takes place as was described for the rocker examples in FIG. 10*c* but instead of the plungers 10-27 & 10-33 being controlled by a rocker action, the action in the instance for a dual push-button switch is controlled by the two opposite push buttons 10-05 and 10-07.

FIG. 11*a* has two referenced rest state, pre-triggered views of a top-back perspective view and a back view showing the basic generator and transmitter circuit module, where the rest state has the pendulum 10-15 and its disposed disk magnet 10 is centered over the coil winding 10-11 on the coil bobbin 10-09. The pendulum 10-15 and its disposed disk magnet 10-17 are held in the center position regardless of how the generator is orientated in three dimensional space due to the strong mutually attractive magnet flux fields existing between the pendulum disk magnet 10-17 and the inner centered core slab magnet 10-13 disposed in the coil bobbin 10-11. There can be a neutral position not only for the centered pendulum 10-15 but also for the two respective plungers 10-27 & 10-33 that are naturally in want of remaining at the same level of distance from the bottom of the plunger wells 10-69L & 10-69R and this is the result of the two springs 10-35 & 10-25 in series and in mechanical communication with their respective plunger mates 10-27 & 10-33. This equal level distance is shown in the back face on view in FIG. 11*a* where the left plunger 10-27 and the right plunger 10-33 are at the same height above the referenced bottom of the plunger wells that are part of the plunger and slide bar substrate 10-21.

FIG. 11*b* shows the two referenced top back view and the back face view of the basic generator embodiment in an active state of triggering and in a point in time the pendulum and its associated disk magnet have been triggered into an oscillatory swing to the left by action of the left plunger 10-27 being pushed downward by an externally applied push force (from a human finger or some mechanical or robotic rod) that causes the slide rod 10-21 to shift to the right (it obeys inverse motion action). Simultaneously, the opposite plunger 10-33 is forced upward by action of the slide bar 10-21 moving to the right side and coming in mechanical communication with the right plunger system 10-33. Also, in FIG. 11*b* it is illustrated that the two plungers 10-27 & 10-33 are not in an equidistance position state momentarily due to the triggering action where in this instance the left plunger 10-27 is forced down due to the triggering and the right plunger 10-33 will still be in a maximum up position by the spring force of its associated mated spring 10-35 and the second plunger 10-33, on the opposite side right of the first actuated plunger 10-27, will not experience any movement or influence during this opposite end first plunger 10-27 action as is its nature in the system. This momentarily uneven level distance is shown in the back face on view in FIG. 11*a* where the left plunger 10-27 is momentarily, during the forced downward triggered plunge, at its lowest height and the right plunger 10-33 remains at the same maximum up level height above the referenced bottom of the plunger wells that are part of the plunger and slide bar substrate 10-21.

Figure 12A:
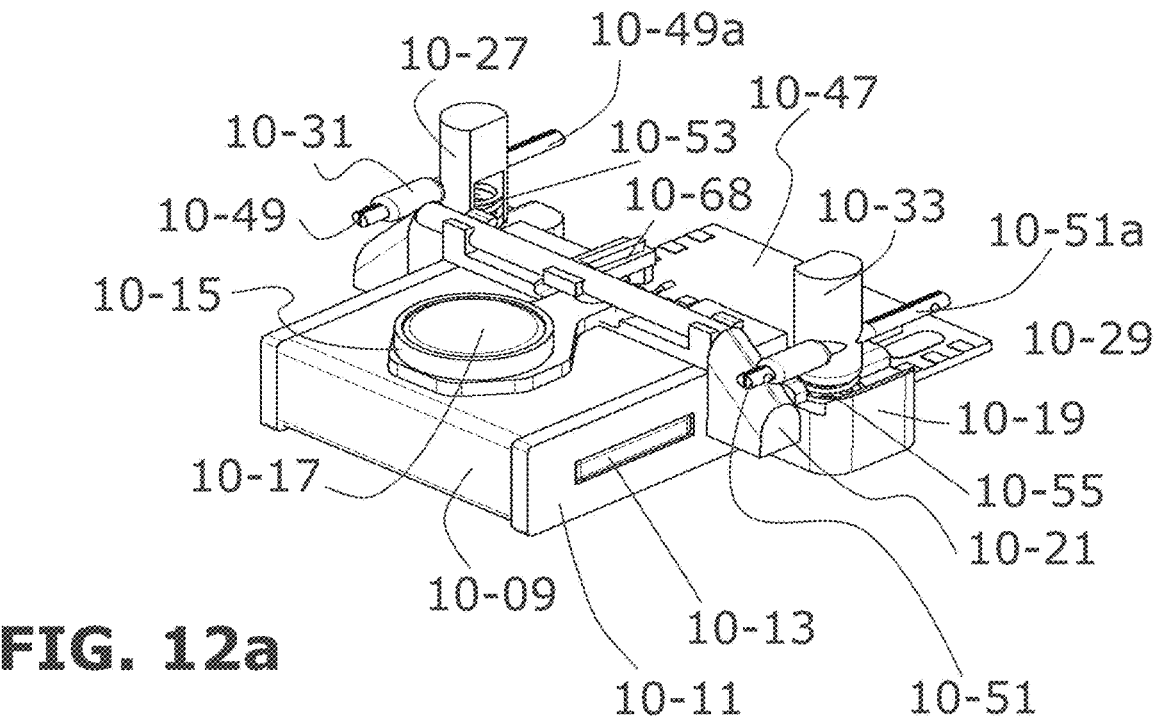
FIG. 12a is a top perspective view of the second embodiment of the generator showing all components for the pendulum and its disposed magnet triggering system existing in a resting or pre-triggered state.

FIG. 12*a* is a referenced rest state, pre-triggered view of a top-back perspective view and a back view showing the basic generator and transmitter circuit module, where the rest state has the pendulum 10-15 and its disposed disk magnet 10-17 is centered over the coil winding 10-11 on the coil bobbin 10-09. The pendulum 10-15 and its disposed disk magnet 10-17 are held in the center position regardless of how the generator is orientated in three dimensional space due to the strong mutually attractive magnet flux fields existing between the pendulum disk magnet 10-17 and the inner centered core slab magnet 10-13 disposed in the coil bobbin 10-11. There can be a neutral position not only for the centered pendulum 10-15 but also for the two respective plungers 10-27 & 10-33 that are naturally in want of remaining at the same level of distance from the bottom of the plunger wells 10-69L & 10-69R and this is the result of the two springs 10-35 & 10-25 in series and in mechanical communication with their respective plunger mates 10-27 & 10-33. This equal level distance is shown in the back face on view in FIG. 11*a* where the left plunger 10-27 and the right plunger 10-33 are at the same height above the referenced bottom of the plunger wells that are part of the plunger and slide bar substrate 10-21.

Figure 12B:
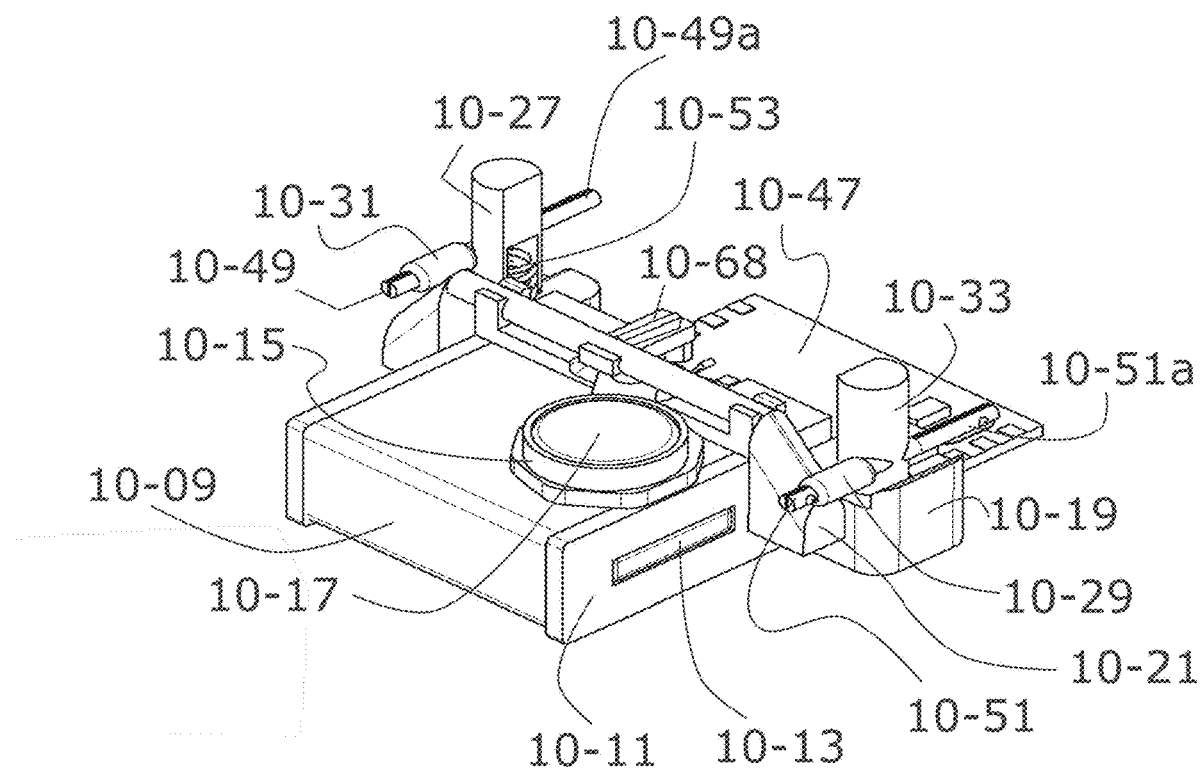
FIG. 12b is a top perspective view of the second embodiment of the generator showing all components for the pendulum and its magnet triggering system in a second initial right directional maximum swing of the oscillating pendulum with its disposed magnet.

FIG. 12*b* shows the referenced top back perspective view of the basic generator embodiment in an active state of triggering and in a point in time the pendulum and its associated disk magnet have been triggered into an oscillatory swing to the right by action of the right plunger 10-33 being pushed downward by an externally applied push force (from a human finger or some mechanical or robotic rod) that causes the slide rod 10-21 to shift to the left (it obeys inverse motion action). Simultaneously, the opposite plunger 10-27 is forced upward by action of the slide bar 10-21 moving to the right side and coming in mechanical communication with the left plunger system 10-27. Also, as in FIG. 11*b* it is illustrated that the two plungers 10-27 & 10-33 are not in an equidistance position state momentarily due to the triggering action where in this instance the right plunger 10-33 is forced down due to the triggering and the right plunger 10-27 will still be in a maximum up position by the spring force of its associated mated spring 10-25 and the second plunger 10-27, on the opposite side left of the first actuated plunger 10-33, will not experience any movement or influence during this opposite end first plunger 10-33 action as is its nature in the system. This momentarily uneven level distance is shown in the back face on view in FIG. 11*a* where the right plunger 10-33 is momentarily, during the forced downward triggered plunge, at its lowest height and the left plunger 10-27 remains at the same maximum up level height above the referenced bottom of the plunger wells that are part of the plunger and slide bar substrate 10-21.

Figure 13A:
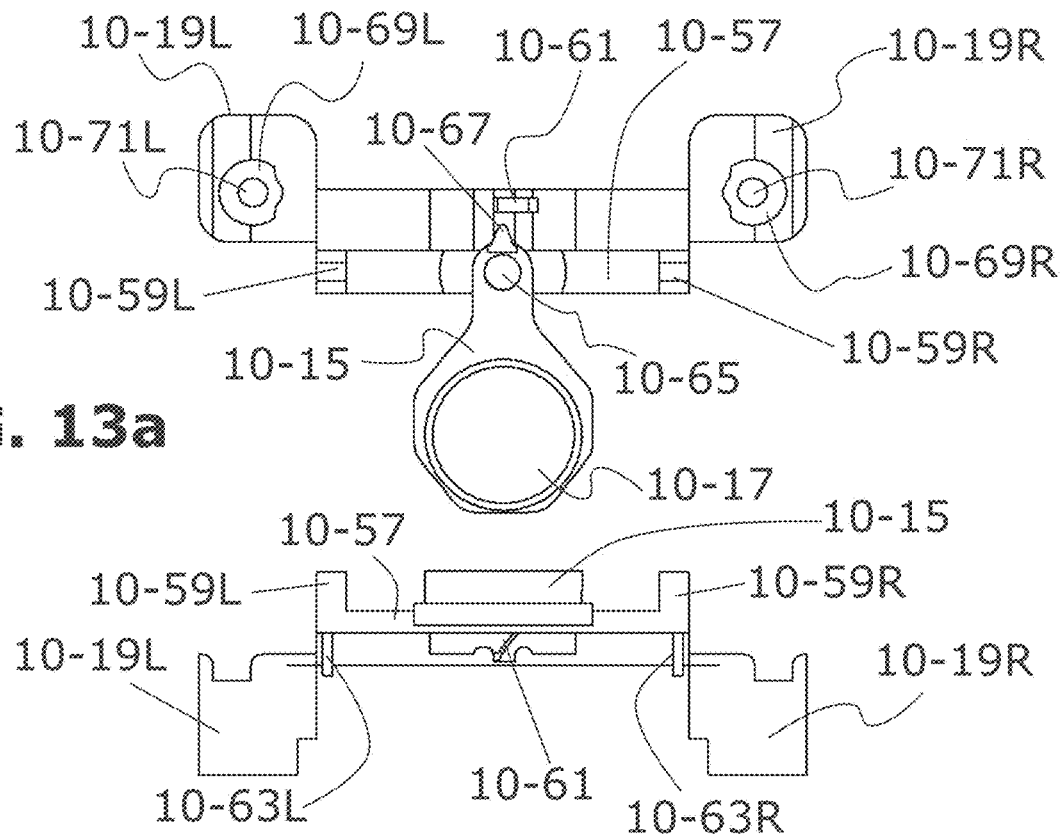
FIG. 13a includes top and back views of the primary pendulum trigger system illustrating the trigger tooth component and leaf flip spring component.

FIG. 13*a* are dual views of, the top face down of the essential plunger substrate 10-19 (as shown in previous figures including FIG. 12a) and its individual essential features of; the plunger and slide rod substrate 10-19, with left and right plunger insertion wells 10-69L & 10-69R with their respective plunger spring insertion guides and hold down protrusion 10-71L & 10-71R that act as a travel guide for each respective plunger 10-27 & 10-33, two slide rod finger type catch travel guides, which are a left guide 10-59L and a right guide 10-59R for supporting and guiding the slide trigger rod 10-21 during triggered slide operations, the pendulum 10-15 with its disposed associated disk magnet 10-17 that is free to have its through hole 10-64h inserted and disposed on the axle 10-65 that is also part of the plunger and slide rod substrate 10-19, and lastly, the "FLIP-FLOP" action leaf spring 10-61 that is put into action during a triggering sequence through its natural capability of being bent in a manner that allows itself to perform that natural bend as a consequence of the slide bar rod 10-21 moving and as the leaf spring 10-61 is disposed and compartmentalized within the confines between the sub-section of the slide bar rod 10-21 that is a channel (shown in FIGS. 134A & B) and the channel sub-section 1€352 (shown in FIGS. 13-1A & B) with its stop guards 10-54 & 10-56 (shown in FIGS. 134A & B) disposed on a lower region of the axle bar rod substrate 10-19 (shown in FIGS. 13-1A & B).

Figure 13B:
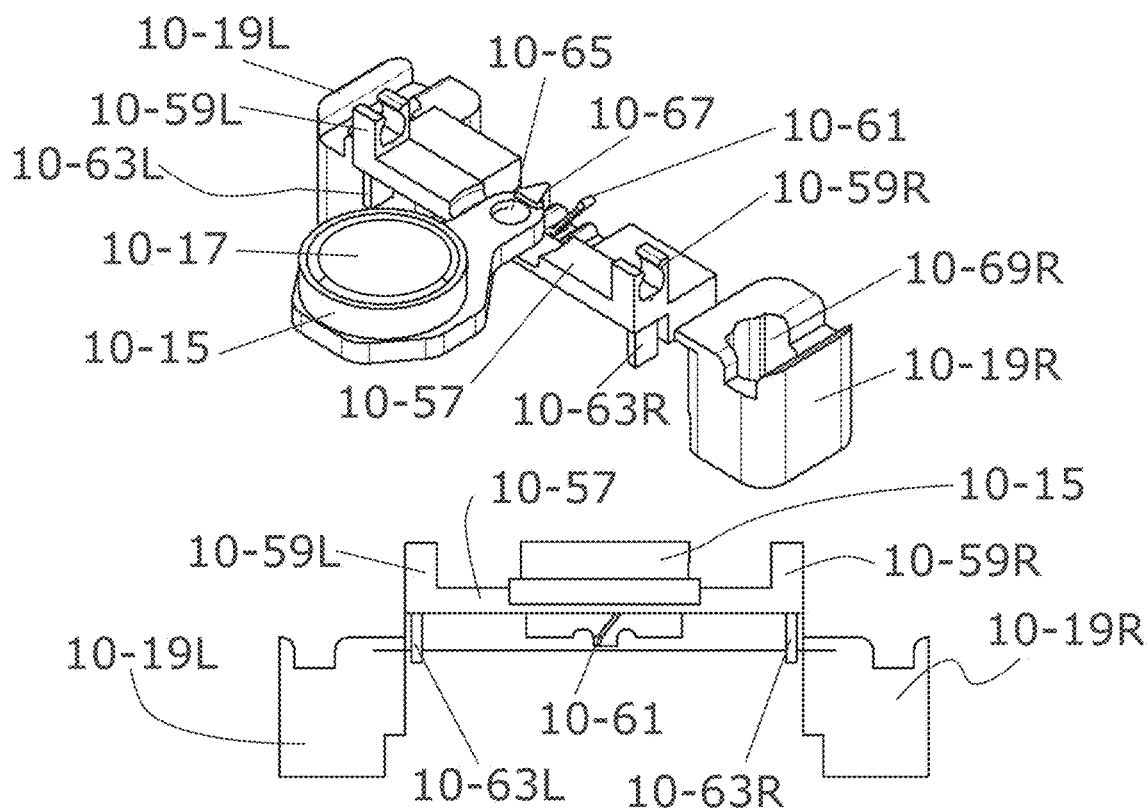
FIG. 13b includes top perspective and back views of the primary pendulum trigger system illustrating the trigger tooth component and leaf flip spring component and also showing the plunger wells and slider bar support.

FIG. 13b shows the referenced top back perspective view of the basic generator embodiment in an active state of triggering and in a point in time the pendulum and its associated disk magnet have been triggered into an oscillatory swing to the right by action of the right plunger 10-33 being pushed downward by an externally applied push force (from a human finger or some mechanical or robotic rod) that causes the slide rod 10-21 to shift to the left (it obeys inverse motion action). Simultaneously, the opposite plunger 10-27 is forced upward by action of the slide bar 10-21 moving to the right side and coming in mechanical communication with the left plunger system 10-27. Also, as in FIG. 11b, it is illustrated that the two plungers 10-27 & 10-33 are not in an equidistance position state momentarily due to the triggering action where in this instance the right plunger 10-33 is forced down due to the triggering and the right plunger 10-27 will still be in a maximum up position by the spring force of its associated mated spring 10-25 and the second plunger 10-27, on the opposite side left of the first actuated plunger 10-33, will not experience any movement or influence during this opposite end first plunger 10-33 action as is its nature in the system. This momentarily uneven level distance is shown in the back face on view in FIG. 11a where the right plunger 10-33 is momentarily, during the forced downward triggered plunge, at its lowest height and the left plunger 10-27 remains at the same maximum up level height above the referenced bottom of the plunger wells that are part of the plunger and slide bar substrate 10-21.

FIG. 13-1-A is an expanded top perspective view of the section that governs the movement of the leaf spring 10-61 during a UP-DOWN, PUSH-POP triggering sequence for ON/OFF electrical connexion operation of the battery-less and wireless remote control switch embodiment of the present invention. The focused featured components disposed on sections of the slide bar rod 10-21 and the axle bar rod support substrate 10-19 are comprised of; a channeled under-region 10-50 disposed in the slide rod 10-21 slide button's associated 10-43 attachment component 10-68 (shown in FIG. 10b), the lower section axle bar substrate 10-19 that has disposed a mid-channeled region 10-52 with its two side guard stops 10-54 & 10-56, and the leaf spring 10-61. Position location references are with the pendulum 10-15, its mated (throughout this document text, the term "mated" refers to a CAD/CAM term meaning a contiguous arrangement between two parts in an assembly that has a single or a plurality of allowed directions of movement without constraints) disk magnet 10-17, the slide bar 10-21, and the axle bar and plunger substrate 10-19. The operation that affects the bending of the leaf spring occurs when the slide bar rod 10-21 moves through the stationary axle bar rod and plunger substrate 10-19.

FIG. 13-1-B is an expanded under-bottom perspective view of the section that governs the movement of the leaf spring 10-61 during a UP-DOWN, PUSH-POP triggering sequence for ON/OFF electrical connexion operation of the battery-less and wireless remote control switch embodiment of the present invention. The focused featured components disposed on sections of the slide bar rod 10-21 and the axle bar rod support substrate 10-19 are comprised of; a channeled under-region 10-50 disposed in the slide rod 10-21 slide button's associated 10-43 attachment component 10-68 (shown in FIG. 10b), the lower section axle bar substrate 10-19 that has disposed a mid-channeled region 10-52 with its two side guard stops 10-54 & 10-56, and the leaf spring 10-61. Position location references are with the pendulum 10-15, its mated (throughout this document text, the term "mated" refers to a CAD/CAM term meaning a contiguous arrangement between two parts in an assembly that has a single or a plurality of allowed directions of movement without constraints) disk magnet 10-17, the slide bar 10-21, and the axle bar and plunger substrate 10-19. The operation that affects the bending of the leaf spring occurs when the slide bar rod 10-21 moves through the stationary axle bar rod and plunger substrate 10-19.

Figure 14A:
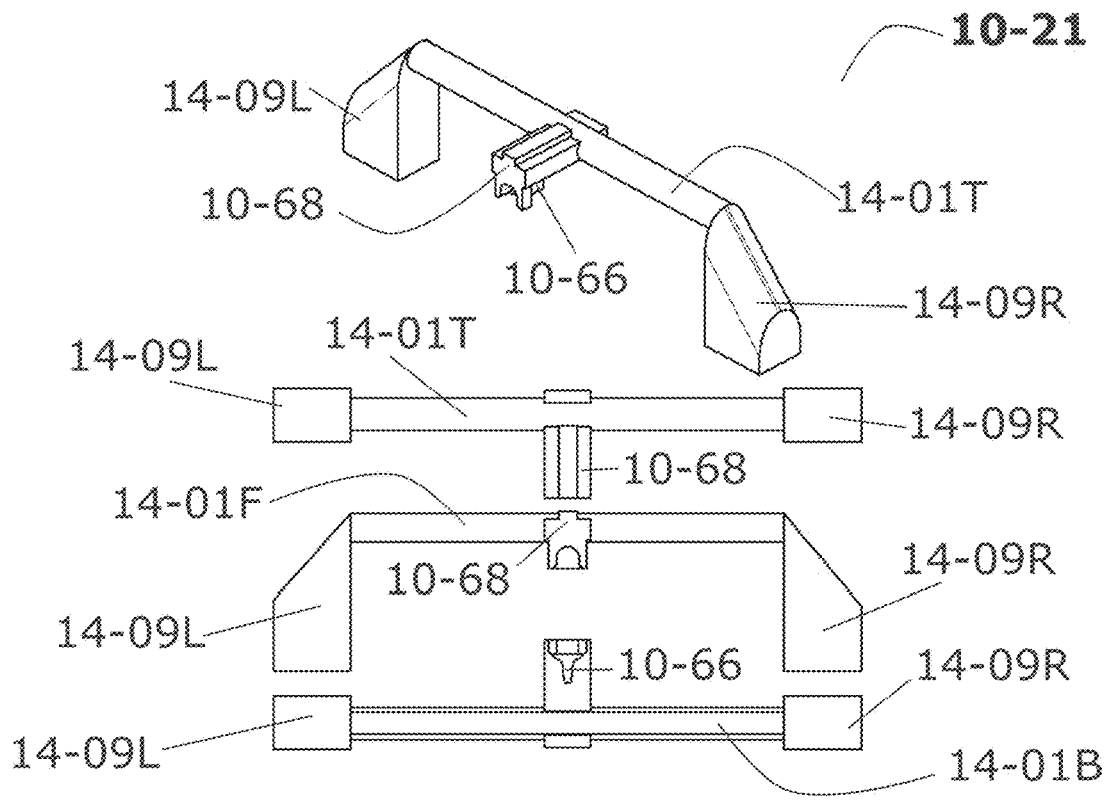
FIG. 14a shows four views of the slider bar and its connection part that the slide button connects to and its trigger tooth that interacts with the pendulum trigger tooth for downward and upward system triggering.

FIG. 14a shows four different views of the slide bar rod 10-21 where starting with the top drawing in FIG. 14a and sequencing down, are; [1] the top drawing that is a top perspective view of the slide bar rod 10-21 that is movable from side to side in the generator system (shown throughout the drawings in this document) and the identifying features are the slide button's associated 10-43 (shown in FIG. 10b) attachment component 10-68 (shown in FIG. 10b), the slide bar rod's trigger tooth that periodically during a trigger sequence has mechanical communication with the pendulum's trigger tooth 10-67 on the pendulum 10-15, and both the left 14-09L and right 14-09R sections of the slide bar rod 10-21 that periodically has mechanical communication with each of the left 10-27 and right 10-33 plungers' left 10-31 and right 10-29 rollers respectively, the top cylindrical surface area of the slide bar rod 10-21 and the inner channel 10-50 disposed within the under-mid-section of the slide bar rod 10-21, [2] the second FIG. up-view of the top of the slide bar rod 10-21 up-side cylindrical surface 14-01T, the left section 14-09L of the slide bar rod 10-21 that has periodic mechanical communication with the left roller 10-31 (shown in previous drawings in this document) and disposed on the left plunger 10-27 (shown in previous drawings in this document), the right section 14-09R of the slide bar rod 10-21 that has periodic mechanical communication with the right roller 10-29 (shown in previous drawings in this document) and disposed on the right plunger 10-33 (shown in previous drawings in this document), and the slide button's associated 10-43 (shown in FIG. 10b) attachment component 10-68 (shown in FIG. 10b), [3] the third figure that is the back face view of the slide bar rod 10-21 with its semi-circular (with its bottom side being flat) slide rod 14-01F, the left section that has periodic mechanical communication with the right 10-33 plunger's roller 10-29, the right section that has periodic mechanical communication with the right 10-33 plunger's roller 10-29, the slide button's associated 10-43 (shown in FIG. 10*b*) attachment component 10-68 (shown in FIG. 10*b*), and the inner channel 10-50 disposed within the under-mid-section of the slide bar rod 10-21, and lastly [4] the bottom view of the slide bar rod underside 14-01B that is a flat section of the semi-circular rod shaped rod 14-01 the left section that has periodic mechanical communication with the right 10-33 plunders roller 10-29, the right section that has periodic mechanical communication with the right 10-33 plunger's roller 10-29, the slide button's associated 10-43 (shown in FIG. 10*b*) attachment component 10-68 (shown in FIG. 10*b*), and the flat channel 10-56 disposed on the top surface of the axle bar rod substrate's 10-19 mid lower section.

Figure 14B:
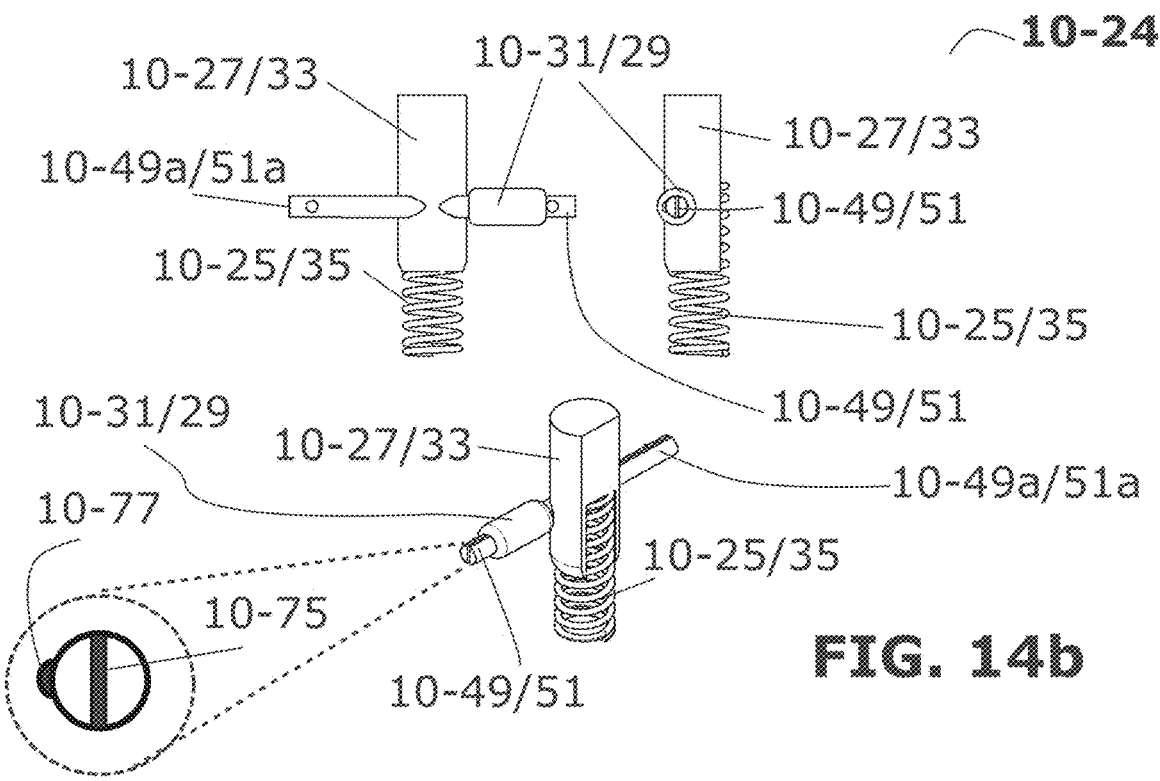
FIG. 14b includes three views and a magnified view of the plunger system with its springs and rollers.

FIG. 14*b* are three views of the plungers 10-27/33, springs 10-25/35, and rollers 10-31/29 that comprise the dual plunger system of the present invention embodiment.

Each component in FIG. 14*b* are labeled for their duality representation in the system figure "F/G. 14*b*" and are identified dually as the left 10-27 and right 10-33 plunger labeled as "10-27/33", left and right rollers labeled as "10-25/35," the left and right rollers are disposed on their respective plunger disposed dual 10-49/51 π/2 angle extension rods labeled as "10-49/51," dual 10-25/35 plunger springs labeled as "10-25/35," and in the expanded view each dual 10-49/51 π/2 angle extension rod has disposed a blind slit 10-75 that momentarily compresses during insertion of the respective roller 10-31/29 onto the respective plunger dual 10-49/51 π/2 angle extension rod and after the full insertion, each roller is locked in place by the lock tab 10-77 on one side of each plunger dual 10-49/51 π/2 angle extension rod leaving each roller 10-31/29 free to rotate about the axis of each respective π/2 angle extension rod 10-49/51 during periodic triggered sequencing.

Figure 15A:
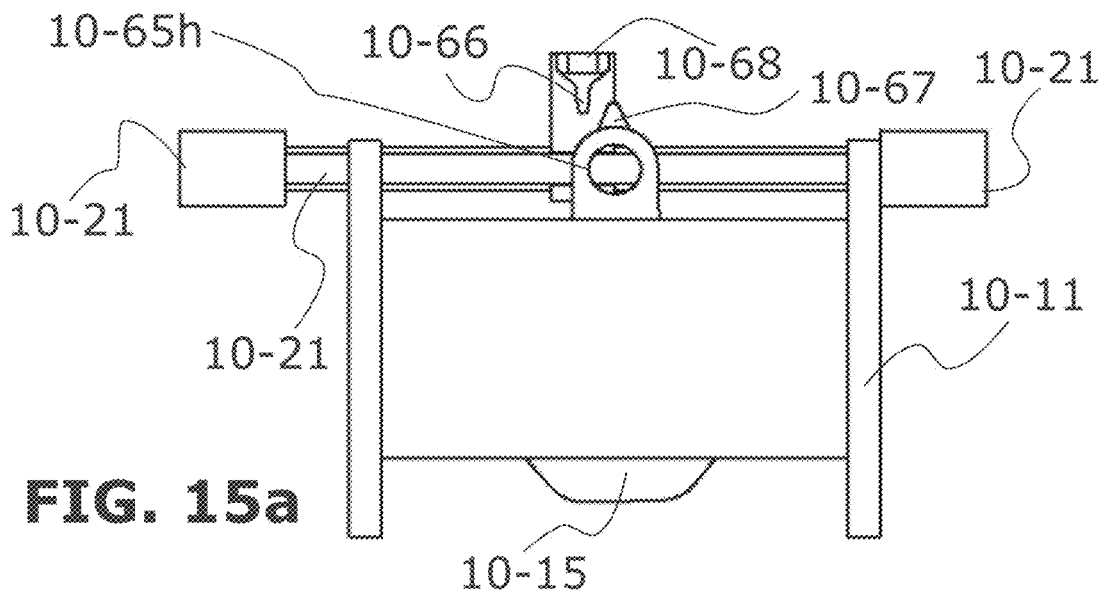
FIG. 15a is a top view showing the coil bobbin, pendulum, and slide bar.

To further show (for clarity) the partial novel triggering component contribution, FIG. 15*a* illustrates a bottom faceview showing a plurality of components in the overall triggering system that include in this view of; the coil bobbin 10-11, the slide bar rod 10-21 (the slide bar rod has three referred to rod surface areas; top positive curved area 14-01T, back face area 14-01BF and bottom flat face area 14-01B), the pendulum 10-15 with its through hole 10-64*h* that is disposed over and around the axle slide bar rod substrate 10-19, the channeled under-region 10-50 disposed in the slide rod 10-21 slide button's associated 10-43 attachment component 10-68, the pendulum trigger tooth 10-67, and the slide bar rod's 10-21 trigger tooth 10-66.

Figure 15B:
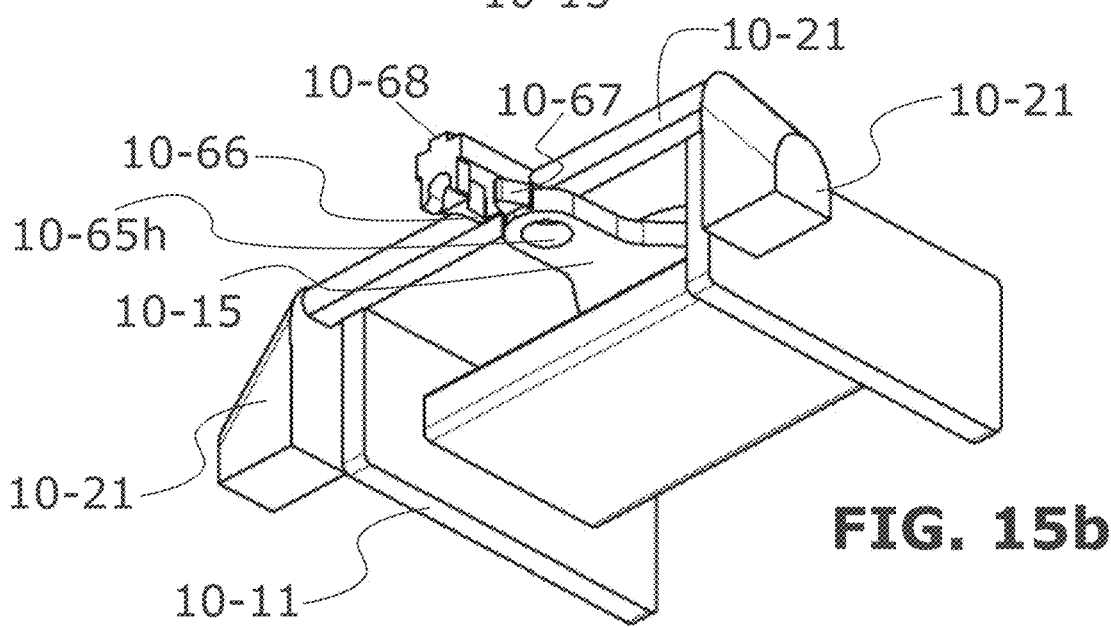
FIG. 15b is a bottom perspective view showing the coil bobbin, pendulum, and slide bar.

FIG. 15*b* is a bottom perspective view showing a plurality of components in the overall triggering system that include in this view of; the coil bobbin 10-11, the slide bar rod 10-21 (the slide bar rod has three referred to rod surface areas; top positive curved area 14-01T, back face area 14-01BF, and bottom flat face area 14-01B), the pendulum with its through hole 10-64*h* that is disposed over and around the axle slide bar rod substrate 10-19, the channeled under-region 10-50 disposed in the slide rod 10-21 slide button's associated 10-43 attachment component 10-68, the pendulum trigger tooth 10-67, and the slide bar rod's 10-21 trigger tooth 10-66.

Figure 15C:
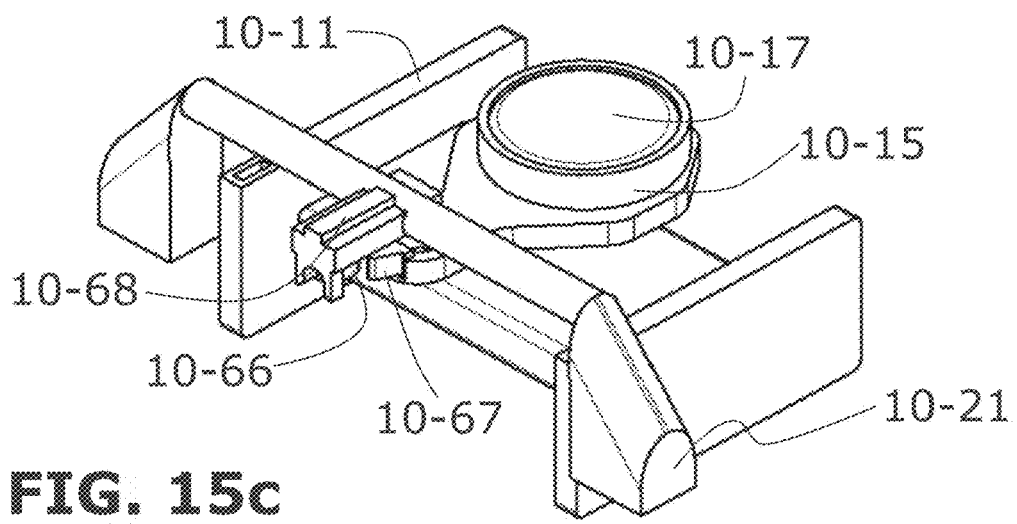
FIG. 15c is a top perspective view of the frontal component that is the securing union for the slide function button in relationship to the pendulum.

FIG. 15*c* is a top perspective view showing a plurality of components in the overall triggering system that include in this view of; the coil bobbin 10-11 the slide bar rod 10-21 (the slide bar rod has three referred to rod surface areas; top positive curved area 14-01T, back face area 14-01BF and bottom flat face area 14-01B), the pendulum 10-15 with its through hole 10-64*h* that is disposed over and around the axle slide bar rod substrate 10-19, the channeled under-region 10-50 disposed in the slide rod 10-21 slide button's associated 10-43 attachment component 10-68, the pendulum trigger tooth 10-67, and the slide bar rods 10-21 trigger tooth 10-66.

FIG. 16*a* is a top perspective view additional embodiment of the dual push button generator/transceiver (circuitry and generator shown in previous drawings in this document) housed within its box enclosure 10-01 its top cover 10-03 with disposed dual through holes 10-2 & 10-4 that provides a guided travel path down and up for the dual plungers 10-27 & 10-33 through the dual through holes 10-2 & 10-4, and a small through hole 10-16 for exposure of an optional light emitting diode (not shown) that serves the purpose of a verification return signal annunciation (to verify that a switching condition took place with "out-of-sight" remote transceiver placement and this is required for any safety regulations and certifications).

FIG. 16*b* is a top perspective view additional embodiment of the dual push button switch transceiver (circuitry and generator shown in previous drawings in this document) housed within its box enclosure 10-01, its top cover 10-03 with disposed dual through holes 10-2 & 10-4 that provides a guided travel path down and up for the dual plungers 10-27 & 10-33 through the dual through holes 10-2 & 10-4, and a small through hole 10-16 for exposure of an optional light emitting diode (not shown) that serves the purpose of a verification return signal annunciation (to verify that a switching condition took place with "out-of-sight" remote transceiver placement and this is required for any safety regulations and certifications). The dual plungers 10-27 & 10-33 have their respective push style control buttons 10-05 & 10-07 disposed by insertion onto each respective plunger 10-27 & 10-33.

FIG. 16*c* is a top perspective view of the additional embodiment of a slide switch transceiver (circuitry and generator shown in previous drawings in this document) housed within its box enclosure 10-01 with its disposed bespoke slide type through hole 10-14 top cover 10-41 where the slide attachment section 10-68 disposed on the slide bar rod 10-21, and the slide type control button 10-43 that is disposed onto the slide attachment section 10-68 of the slide bar rod 10-21 by the slide control button's 10-43 blind insert hole 10-20 where there is fixed and continuous mechanical communication between the slide control button 10-43 and the slide attachment section 10-68 of the slide bar rod 10-21, and a small through hole 10-16 for exposure of an optional light emitting diode (not shown) that serves the purpose of a verification return signal annunciation (to verify that a switching condition took place with "out-of-sight" remote transceiver placement and this is required for any safety regulations and certifications).

FIG. 16*d* is a top perspective view of the additional embodiment of a rocker (see-saw type) switch transceiver (circuitry and generator shown in previous drawings in this document) housed within its box enclosure 10-01 with its bespoke top cover 10-37 that has disposed two finger catch protrusions 10-10 & 10-12 that are securing regions for the rocker control snap-on control attachment's 10-39 under-rod 10-28 (the rocker control attachment 10-39 is free to rock forth and back on its under-rod's axis 10-28*x* that is zero displacement parallel aligned with the finger catch protrusion's axis 10-30*x*). The rocker during its triggering operation has in one instance, a push down on the first rocker side 10-39*a* that then comes in mechanical communication with its associated plunger 10-27 that protrudes through the top cover associated through hole 10-6, and the opposite instance where a push down on the second rocker side 10-39b comes in mechanical communication with its associated plunger 10-33 that protrudes through the top cover associated through hole 10-8.

FIG. 16e is a top perspective view of the slide bar rod 10-21 that is utilized and is a component in the all the additional embodiments described above. The only difference with the additional embodiments is the exchanging of top covers and control elements that describe the type of control for various triggering operations.

Figure 18A:
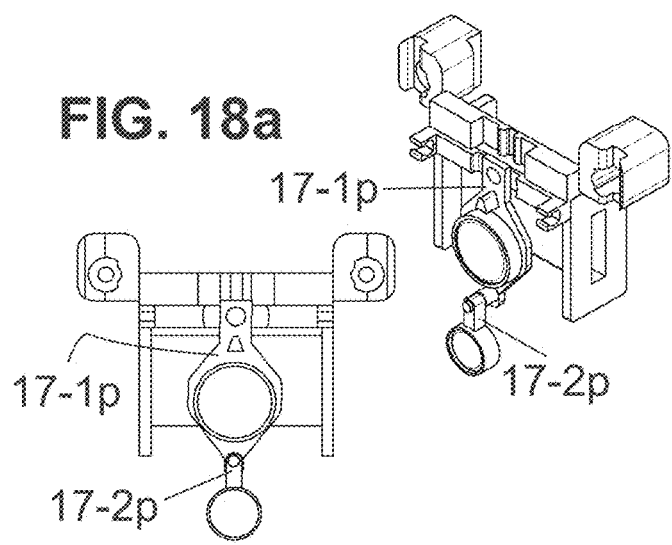
FIG. 18a includes a combination front and top frontal views of the dual pendulum with its two magnets disposed for free rotation about their respective axis and where the pendulums are at rest in an equilibrium state, prior to being triggered into motion.
Figure 18B:
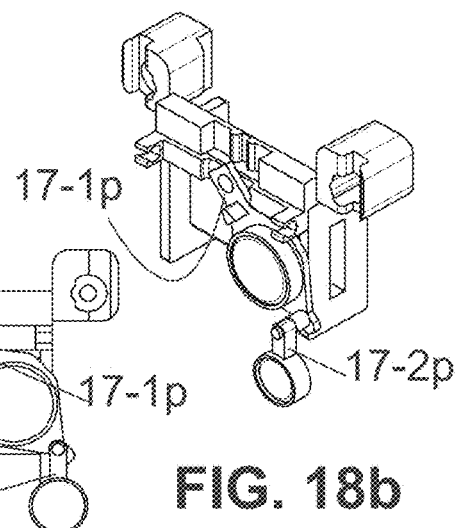
FIG. 18b includes a combination front and top frontal views of the dual pendulum with its two magnets disposed for free rotation about their respective axis and where the pendulums are triggered and set in maximum displacement to the right in a triggered state, and set into oscillatory motion.
Figure 18C:
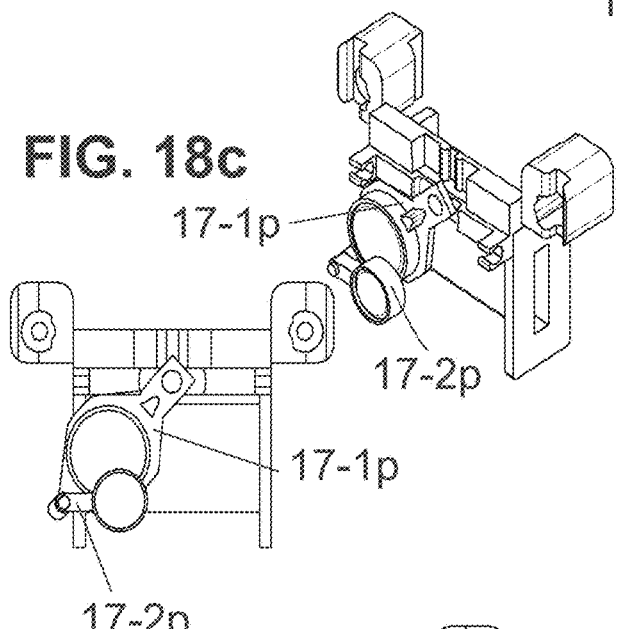
FIG. 18c includes a combination of front and top frontal views of the dual pendulum with its two magnets disposed for free rotation about their respective axis and where the pendulums are triggered and set in maximum displacement to the left in a triggered state, and set into oscillatory motion.
Figure 18D:
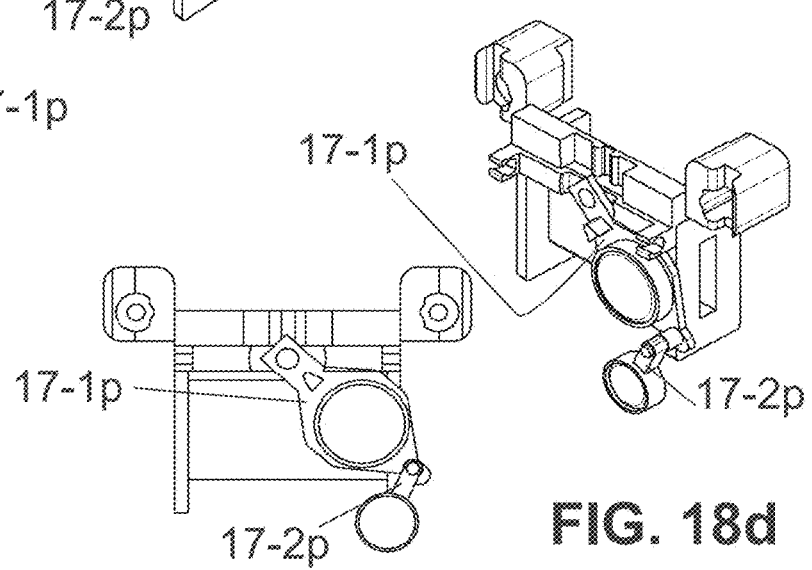
FIG. 18d includes a combination of front and top frontal views of the dual pendulum with its two magnets disposed for free rotation about their respective axis and where the pendulums are triggered and set in maximum displacement to the right in a triggered state, and set into oscillatory motion but the second pendulum with its disposed magnet has a different chaotic oscillatory path now determined by random chance.

The following details describe the additional pendulum embodiment, which is a Lagrangian/Chaos-Theory complex double pendulum that is illustrated in FIGS. 17a, b, c, & d; as well as FIG. 18a, b, c, & d.

FIG. 17a, FIG. 17b, FIG. 17c, FIG. 17d are right-side view, front view, and top perspective view respectively shown of another pendulum embodiment that is part of the present invention that is a complex Lagrangian/Chaos Theory pendulum 17-1 with its primary disposed magnet 17-9 that has disposed a through hole can is fitted to an axle 10-65, which is disposed on the axle bar rod substrate 10-19 and is free to rotate about the axle's 10-65 axis 10-65x (shown in FIG. 13a, 13B). All three views show the following disposed double pendulum features of; the primary pendulum base 17-1 with its disposed disk magnet 17-9, there is disposed a trigger tooth protrusion 17-5 disposed on the primary pendulum base 17-1, also there is an axle 17-11 where a secondary pendulum base 17-13 with its disposed secondary disk magnet 17-15 and where a through hole 17-3 is fitted around and on the secondary pendulum's 17-13 axle protrusion 17-11, and the secondary pendulum and its disk magnet are free to rotate about the axis 17-12. With the double pendulum structure, during a triggering sequence the first ((primary) pendulum 17-1 with its disk magnet 17-9 is free to swing into oscillation over the coil (shown in previous drawings in this document) but in the situation where the secondary pendulum 17-13 with its disk magnet 17-15 has connected to it, the secondary pendulum 17-13 with its disk magnet 17-15, the situation with this arrangement has the secondary pendulum 17-13 and its disk magnet 17-15 being a chaotic slave pendulum that receives its momentum by the swinging oscillations of the primary pendulum 17-1; when this occurs during triggering, the chaotic oscillatory behaviour of the secondary disk magnet 17-15 has at times constructive but destructive magnetic influence on the overall electromagnetic voltage outcome felt at the terminals of the coil (shown in previous drawings in this document). The constructive influence on the overall electromagnetic voltage outcome can be realized if the magnetic pole changing parallel arrangement that always sees both primary and secondary pendulum magnets 17-9 & 17-15 always repelling each other from a chaotic minimum to maximum positioning during the swinging oscillations of both magnets as a result of triggering by an external applied force, FIG. 17d is a front view of the double complex pendulum system (shown in FIG. 17a, b, & c) as it is disposed and connected to the generator axle bar rod substrate 10-19, where the through hole 17-3 on the primary pendulum 17-1 is disposed and fitted on the substrate 10-19 axle 10-65 that is disposed on a sub-section 10-57 of the substrate 10-19.

FIGS. 18 a, b. c, & d all illustrate several of an infinite possible movements during the actions for triggering into motion of the double pendulum system 17-1p & 17-2p with its primary pendulum arrangement with its disk magnet 17-1p and its secondary pendulum with its disk magnet 17-2p.

FIG. 19 is a graphic with equations describing the action of the single (simple) pendulum.

Figure 20:
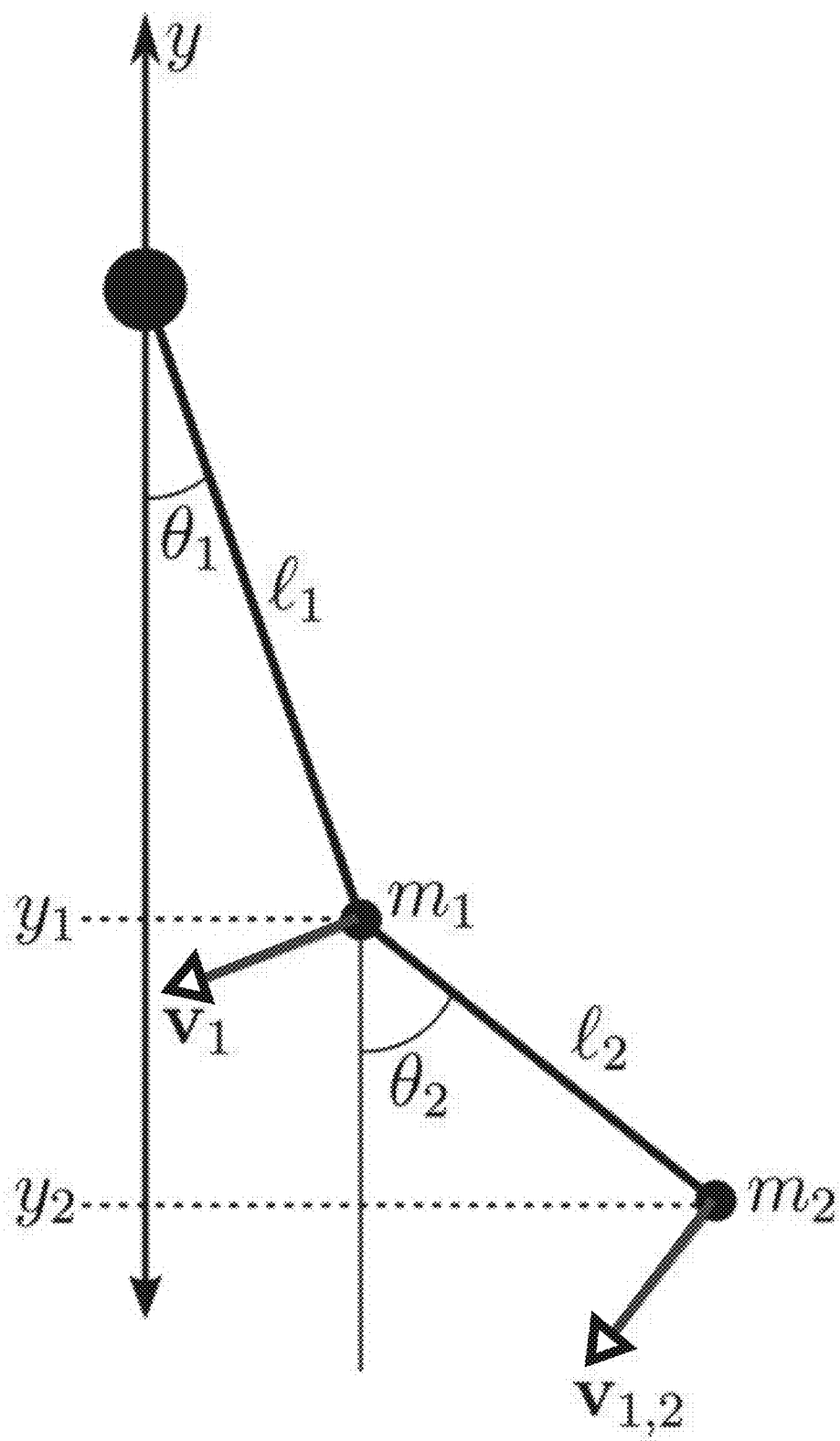
FIG. 20 is a vector graphic representative of the dual pendulum system of the second embodiment of the invention.

FIG. 20 is the graphical reference to the treatise on the Lagrangian double pendulum analysis described below.

Lagrangian Double Pendulum Analysis

The use of Lagrangian mechanics spurs on the development of thinking in terms of state spaces by considering different kinds of coordinates that may be more convenient for the problem at hand. It is easier to think about the angular positions $\theta_1$ and $\theta_2$ of a pendulum than it is to derive it using x- and y-coordinates directly (and for our problem, physical constraints in the x and y-coordinates, here made by assuming that the rods are rigid, make it somewhat less straightforward to deal with). Of course, we might use the x- and y-coordinates in parts of our derivation, but it is not so easy to solve for them.

Lagrangian mechanics also has us think of things in terms of energy, a quantity whose properties crop up in math a lot. The analysis of this embodiment Is to derive the Lagrangian L of the system. L is the difference between total kinetic energy T and total potential energy V. The total kinetic energy of our system should be the sum of that of the two particles, $$T = \tfrac{1}{2} m_1 v_1^2 + \tfrac{1}{2} m_2 v_2^2, \qquad (\text{eq. 9})$$

and the potential energy (assuming that our pendulums are subject to downward acceleration g) depends only on the height of the two pendulum bobs;

$$V = m_1 g y_1 + m_2 g y_2. \qquad (\text{eq. 10})$$

However, if we want to express this in terms of the angular coordinates, we find, via the usual trigonometric arguments, that $y_1 = -\ell_1 \cos \theta_1$ and since $y_2$ includes the height of the first pendulum, $y_2 = -\ell_1 \cos \theta_1 - \ell_2 \cos \theta_2$. In total, this means $$V = -(m_1 + m_2) \{ g \ell_1 \cos \theta_1 - m_2 g \ell_2 \cos \theta_2. \qquad (\text{eq. 11})$$

Now the kinetic energy is a little trickier. Here, we assume that the first pendulum bob has linear velocity $v_1$, and speed $|v_1| = v_1$. Now, if we let the second pendulum bob have linear velocity $v_{1,2}$ relative to the first, then the total velocity of the second bob is $v_2 = v_1 + v_{1,2}$. The reason that $v_{1,2}$ is useful Is that it is calculated in exactly the same way as the first pendulum (because the second pendulum is a pendulum).

So the total (squared) speed of the second pendulum bob is $v_2^2 = v_1^2 + 2 v_1 \cdot v_{1,2} + v_{1,2}^2$.

Now, to figure out $v_1 * v_{1,2}$, we use the geometric (length and angle) formulation of the dot product:

$$v_1 \cdot v_{1,2} = v_1 v_{1,2} \cos \phi \qquad (\text{eq. 12})$$

where $\phi$ is the angle between $v_1$ and $v_{1,2}$. But the angle between $v_1$ and $v_{1,2}$, since both are perpendicular to their respective rods, must be the same as the angle between the rods: $\phi = \theta_2 - \theta_1$. Finally, to express the magnitudes $v_1$ and $v_{1,2}$, we use the relations $v_1 = \theta'_1 \ell_1$ and $v_{1,2} = \theta'_2 \ell_2$. This gives $$v_2^2 = \ell_1 \theta'_1{}^2 + 2\theta'_1 \theta'_2 \ell_1 \ell_2 \cos(\theta_2 - \theta_1) + \ell_2{}^2 \theta'_2{}^2 \qquad (\text{eq. 13})$$

This finally gives $$T = \tfrac{1}{2}(m_1 + m_2) \ell_1 2\theta'_1{}^2 + \tfrac{1}{2} m_2 (2\theta'_1 \theta'_2 \ell_1 \ell_2 \cos(\theta_2 - \theta_1) + \ell_2{}^2 \theta'_2{}^2), \qquad (\text{eq. 14})$$

or, $$L=T-V=\frac{1}{2}(m_1+m_2)\ell_1^2\theta'_1^2+\frac{1}{2}m_2(2\theta'_1\theta'_2\ell_1\ell_2\cos(\theta_2-\theta_1)+\ell_2^2\theta'_2^2)+(m_1+m_2)g\ell_1\cos\theta_1+m_2\ell_2\cos\theta_2.$$ (eq. 15)

Then the equation must be modified to include the influence of each magnet's force disposed on the base of each pendulum component. Without the two magnets, the Lagrangian equation is; L=T−V With the magnets the Lagrangian equation is:

$$L=T(m_pF_p+m_sF_s)-V(m_pF_p+m_sF_m)$$ (eq. 16)

Where $T=\frac{1}{2}m_1v_1^2+\frac{1}{2}m_2v_2^2$, and $V=m_1gy_1+m_2gy_2$. (e. 17)

MAXWELL'S electrodynamic equations are based upon three experimental laws: (1) the inverse square law for the electric force between two point charges relatively at rest; (2) Ampere's law for the force between current elements, or its equivalent; (3) Faraday's law of current induction. Helmholtz gave a derivation of Faraday's law from Ampere's law by means of the principle of conservation of energy, which, however, has been shown to be erroneous. Indeed, it has been impossible by any of the methods heretofore used to derive the electrodynamic equations without making use of all three of these experimental laws.

Therefore, if the principle of relativity had been enunciated before the date of Oersted's discovery, the fundamental relations of electrodynamics could have been predicted on theoretical grounds as a direct consequence of the fundamental laws of electrostatics, extended so as to apply to charges relatively in motion as well as to charges relatively at rest. Of course, only that part of the theory derived from the principle of relativity that is independent of any prior knowledge of the electrodynamic equations, will be made use of. Reference is only to the kinematics of relativity: —to use the dynamics of relativity, which is derived from the electrodynamic equations, would be to reason in a circle.

The Equations of Relativity

Time Dilation: Moving clocks appear to tick more slowly to observers at rest.
$t=t'/(1-v^2/c^2)^{1/2}$ t' is the length of a time interval that you measure with your clock,
and t is the length of the same time interval another observer would measure if you were moving past hem with velocity v.
Length Contraction: Moving objects appear shorter to observers at rest.

$$l=l'(1-v^2/c^2)^{1/2}$$

l' is the length of the object that you measure with your ruler,
and l is the length of the same object that another observer would measure if you were moving past them with velocity V. (This only applies to lengths in the same direction as v. All other lengths stay the same.)
Electricity and Magnetism in Two Different Reference Frames:

Suppose you send a current through a wire, and then toss an electron next to it so that it has the same velocity as the electrons flowing through the wire. Using the right hand rule, you can find the direction of the wire's magnetic field. Using it again will show that the wire attracts the electron. This is obviously a magnetic force since the wire does not produce any electric fields.

But what if you walked next to the electron, so that it appeared to stand still in your new reference frame? (This should be easy since electrons usually flow through wires with speeds of a few millimeters per second.) When a charge is not moving it experiences no magnetic force at all! What happens now?

Figure 21A:
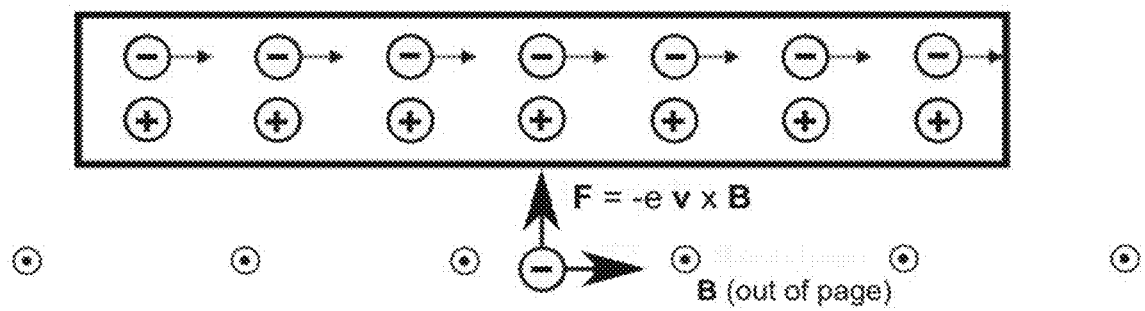
FIG. 21a is a graphic representing a wire observed in a lab reference frame.

The Wire, Observed Ire the Laboratory Reference Frame: Shown in FIG. 21a in the electron's reference frame (where the electron is standing still), all the electrons in the wire now appear to stand still. They are not moving in this reference frame, so the distances between them are no longer length contracted as they were in the laboratory frame. This means the electron sees the other electrons to be spread out compared to what someone in the laboratory frame would measure.

The opposite happens to the positive metal ions. They appear to move backwards in the electron's frame, and so their separations appear length-contracted to the electron. Thus, the electron sees a lower density of negative charges, and a higher density of positive charges, which creates an electric field that attracts the electron.

Figure 21B:
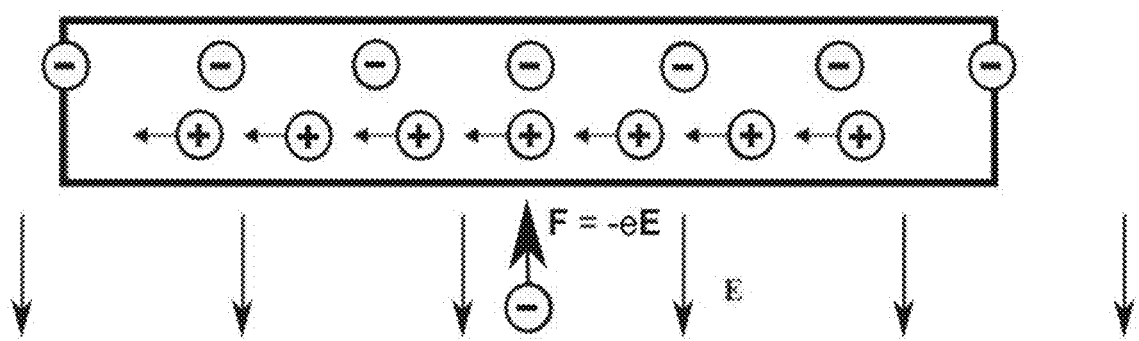
FIG. 21b is a graphic representing a wire observed in the electron's reference frame.

The Wire, Observed in the Electron's Reference Frame: Shown in FIG. 21b

Exists with a force caused by an electric field in one reference frame appears to be caused by a magnetic field in another reference frame. In different reference frames, the force will appear to be caused by a combination of electric and magnetic fields. However, the same thing always happens: the electron is always attracted to the wire with the same force. This shows that electricity and magnetism are not different from each other. In fact, they are two different ways of looking at the same thing. Therefore, the two are combined into what is now called the "electromagnetic force".

Electricity and magnetism are equally fundamental parts of physics. Special Relativity unites electricity and magnetism into electromagnetism, in the same way that it unites space and time into spacetime. Time does not cause space, space does not cause time, and Special Relativity causes neither space nor time. Special Relativity merely reveals the relatedness of space and time. Similarly, electricity does not cause magnetism, magnetism does not cause electricity, and Special Relativity causes neither electricity nor magnetism. Special Relativity merely reveals the relatedness of electricity and magnetism.

A lot of people come across (A) in their high school or intro college physics classes, and wind up misunderstanding it as the fundamental reason that magnetism exists. Why is that? And why do textbooks almost never point out (B)?

The reason is simply that nobody questions why electricity exists—electrical attraction and repulsion seem perfectly natural—whereas magnetism seems more mysterious. In other words, this pedagogical asymmetry between electricity and magnetism has nothing to do with physics, and everything to do with our inborn preconceptions and intuitions.

What is claimed is:
1. An electrical generator configured to convert mechanical kinetic energy into electrical energy, wherein the electrical generator comprising;
an enclosure with a cover;
a coil winding about a coil bobbin, said coil winding having terminals;

at least one trigger plunger that is utilized as an operational trigger mechanism;

at least one rotatable pendulum having a first magnet affixed thereto;

and said rotatable pendulum being mounted for rotation relative to said coil;

and said rotatable pendulum being is configured to receive said kinetic energy from said trigger plunger as said trigger plunger periodically comes in kinetic mechanical communication with said rotatable pendulum;

and wherein there is disposed a second magnet that is disposed within the center of said coil bobbin that is in attractive magnetic cooperation with said rotatable pendulum and said first magnet;

and wherein said rotatable pendulum and said first magnet are configured to magnetically interact with said second magnet such that said rotation of said pendulum with its first magnet relative to said second magnet results in electromagnetic induction in said coil, to produce an alternating electrical potential that establishes an exponential damped voltage sinusoidal waveform at said coil terminals as said rotatable pendulum oscillates with respect to said coil bobbin.

2. The electrical generator of claim 1, wherein the first magnet is shaped as a disk.

3. The electrical generator of claim 1, wherein the second magnet is shaped as a bar.

4. The electrical generator of claim 1, wherein:
the enclosure is of the dimensions of a standard industrial limit switch wired-in terminal block; and where the cover relative to said enclosure protects electronic circuitry disposed in the enclosure that is configured to transmit radio frequency (RF) signals.

5. The electrical generator of claim 1, wherein:
the terminals are connected to wires that provide an electrical connection to an electronic circuit that is a radio transmitter circuit.

6. The electrical generator of claim 1, wherein:
the coil bobbin has a centered blind hole to support the first magnet so that is physically concentric with the coil bobbin;
a support for in the coil bobbin for fixedly supporting said first magnet to remain stationary;
an electronic circuit affixed to the coil bobbin, the coil bobbin having end impressions at opposite ends to support corner regions of said electronic circuit.

7. The electrical generator of claim 1, wherein said first magnet is a Neodymium magnet.

8. The electrical generator of claim 1, wherein:
the coil bobbin has a plurality of blind holes; further comprising: a support member to support the pendulum, wherein the support member has a plurality of dowel protrusions that fit into said blind holes.

9. The electrical generator of claim 1, further comprising:
a rotatable pendulum support member having a centered dowel protrusion to accept and allow for free omnidirectional rotation of the pendulum.

10. The electrical generator of claim 1, wherein:
said pendulum is situated proximal the coil bobbin so that magnetic flux field lines are perpendicular to the coil winding; and the action of said pendulum traveling proximal across said coil winding induces an alternating current within the coil winding that is measured as a voltage between said terminals.

11. The electrical generator of claim 1, wherein:
said trigger plunger has a trigger tooth that, periodically during a triggering sequence, is in mechanical communication with a trigger tooth disposed on said pendulum member.

12. The electrical generator of claim 1, wherein:
said tooth of said trigger plunger has a trigger action and a travel limit; the pendulum rotating and oscillating proximal across said coil winding on a pendulum dowel that supports said pendulum in a manner that exponentially diminishes its swing at least in part due to frictional forces between said pendulum and said dowel.

13. The electrical generator of claim 1, where said pendulum is a dual inline complex Lagrangian-Chaos Theory pendulum which swings in a complex swinging mechanical oscillation to produce complex Laplacian defined electrical waveforms.

14. The electrical generator of claim 1, wherein:
said second magnet, is disposed in a blind hole within said coil bobbin;
an enclosure for said second magnetic is configured to allow travel in and out of said trigger plunger; and wherein travel of said trigger plunger in and out of said magnet enclosure is in part dependent upon an external mechanical force applied to said trigger plunger and a spring that is disposed at the bottom of said blind hole.

15. The electrical generator of claim 14, wherein:
said spring counteracts, by mechanical potential energy stored in said spring, said external mechanical force pushing downward through a blind hole in said enclosure; and
potential energy stored in said spring when said downward external force is applied, is converted to kinetic energy as the initially applied external force is removed from influencing said trigger plunger.

16. The electrical generator of claim 1, wherein:
said coil winding is electrically connected to a radio transmitter.

17. The electrical generator of claim 16, wherein the transmitter is an industrial, scientific and medical (ISM) band radio transmitter.

18. An electrical generator configured to convert mechanical kinetic energy into electrical energy, comprising:
an enclosure with a top cover;
a coil winding about a coil bobbin;
a dual independent trigger plunger system that is utilized as an independent operational trigger mechanism;
at least one rotatable pendulum having affixed thereto a first magnet; and
said rotatable pendulum mounted for rotation, said rotatable pendulum and said first magnet being, in unison, rotatable relative to said coil;
and said rotatable pendulum configured to receive said kinetic energy from said dual independent trigger plunger, said plunger being positioned to periodically comes in kinetic mechanical communication with said rotatable pendulum;
and wherein there is disposed a second magnet that is disposed within the center of said coil bobbin to be in attractive magnetic cooperation with said rotatable pendulum and said first magnet;
and wherein said rotatable pendulum and said first magnet are configured to magnetically interact with said second magnet such that said rotation of said pendulum with its first magnet relative to said second magnet results in electromagnetic induction in said coil, to produce a damped sinusoidal waveform voltage at said coil terminals.

19. The electrical generator of claim 18, wherein:
said enclosure has at least one top cover that is adapted to accommodate a plurality of triggering means for causing motion of the pendulum.

20. The electrical generator of claim 19, wherein said triggering means comprises:
  a slide bar means, and a dual push button arrangement for moving said slide bar means from side to side.

21. The electrical generator of claim 19, wherein said triggering means comprises:
  an elongated slide bar rod means, and a see-saw action rocker button means for causing said slide bar means to move side to side.

22. The electrical generator of claim 19, wherein said triggering means comprises:
  a slide button means in mechanical communication with said elongated slide bar.

23. The electrical generator of claim 22, wherein:
said slide button means is fixed to be stationary within a horizontal plane that is perpendicular to said slide bar means.

24. The electrical generator of claim 23, wherein:
said slide button is a part of and contiguous with a slide bar rod and said elongated slide bar rod is free, upon slide triggering, to move from side to side centered in reference to said coil bobbin;
and said top cover has disposed centrally, a through hole to accommodate the insertion of said slide button that is fixedly attached to said contiguous member of said slide bar rod member and said elongated slide bar rod is free, upon slide triggering, to move from side to side off-centered slide movement in reference to said coil bobbin and said enclosure; and
said slide bar rod member has its side to side off from center movement controlled by an independent dual plunger sub-system on an opposite side of said slide bar member.

* * * * *